United States Patent
Maezawa et al.

(10) Patent No.: US 10,659,461 B2
(45) Date of Patent: May 19, 2020

(54) SYSTEM, METHOD, AND RECORDING MEDIUM STORING PROGRAM FOR AUTHENTICATION

(71) Applicant: ISAO CORPORATION, Tokyo (JP)

(72) Inventors: Toshiki Maezawa, Tokyo (JP); Takahiro Nishida, Tokyo (JP); Hiroyuki Kikuchi, Tokyo (JP)

(73) Assignee: ISAO CORPORATION, Tokyo (JP)

( * ) Notice: Subject to any disclaimer, the term of this patent is extended or adjusted under 35 U.S.C. 154(b) by 0 days.

(21) Appl. No.: 16/270,347

(22) Filed: Feb. 7, 2019

(65) Prior Publication Data

US 2019/0207938 A1 Jul. 4, 2019

Related U.S. Application Data

(63) Continuation of application No. PCT/JP2017/028806, filed on Aug. 8, 2017.

(30) Foreign Application Priority Data

Aug. 8, 2016 (JP) .................. 2016-155997
Jan. 13, 2017 (JP) .................. 2017-004428

(51) Int. Cl.
  *H04L 29/06* (2006.01)
  *G06F 21/44* (2013.01)
(52) U.S. Cl.
  CPC .......... *H04L 63/0876* (2013.01); *G06F 21/44* (2013.01); *H04L 63/083* (2013.01); *H04L 63/0807* (2013.01); *H04L 63/0861* (2013.01)
(58) Field of Classification Search
  CPC ............. H04L 63/0876; H04L 63/0807; H04L 63/0861; H04L 63/0869; H04L 63/083; G06F 21/44; G06F 21/445
  See application file for complete search history.

(56) References Cited

U.S. PATENT DOCUMENTS 9,462,965 B2 * 10/2016 Stanley-Marbell ..... G06F 9/542
10,009,340 B2 * 6/2018 Redberg .............. H04L 63/0838
(Continued)

FOREIGN PATENT DOCUMENTS

| JP | 2014-215620 A | 11/2014 |
| JP | 2015-99470 A | 5/2015 |
| WO | 2006/018892 A1 | 2/2006 |

OTHER PUBLICATIONS

International Search Report issued in corresponding International Application No. PCT/JP2017/028806 dated Oct. 17, 2017, with translation (4 pages).
(Continued)

*Primary Examiner* — Hosuk Song
(74) *Attorney, Agent, or Firm* — Osha Liang LLP

(57) ABSTRACT

An authentication system includes: a first terminal; a second terminal; and an authentication subsystem, wherein the first terminal transmits first identification information and a first request for push authentication to the authentication subsystem, the authentication subsystem matches the first identification information against second identification information stored in association with a unique ID of the second terminal, and if the second identification information matching the first identification information exists, transmits a push authentication operation start request to the second terminal based on the stored unique ID of the second terminal, and upon receiving the push authentication operation start request, the second terminal prompts a user to perform a predetermined operation other than inputting any of knowledge authentication information, ownership authentication information, and biometric authentication information, and when the predetermined operation is performed by the user, transmits a push authentication operation completion notification to the authentication subsystem.

23 Claims, 18 Drawing Sheets

(56) References Cited

U.S. PATENT DOCUMENTS 10,122,704 B2 * 11/2018 Xiu ................... H04L 67/2814
10,165,448 B2 * 12/2018 Howard ............... H04W 12/08
10,237,271 B2 * 3/2019 Qiu .................... H04L 63/0876

OTHER PUBLICATIONS

Mitsuhiro Okamoto, "Access Authentication System Not Requiring Password", NTT Technical Journal, The Telecommunications Association, Jan. 1, 2006, vol. 18, No. 1, pp. 50-51 (8 pages).
Office Action issued in corresponding Japanese Patent Application No. 2016-155997 dated Sep. 20, 2016 (3 pages).
International Preliminary Report on Patentability issued in corresponding International Application No. PCT/JP2017/028806 dated Feb. 12, 2019 (14 pages).

* cited by examiner

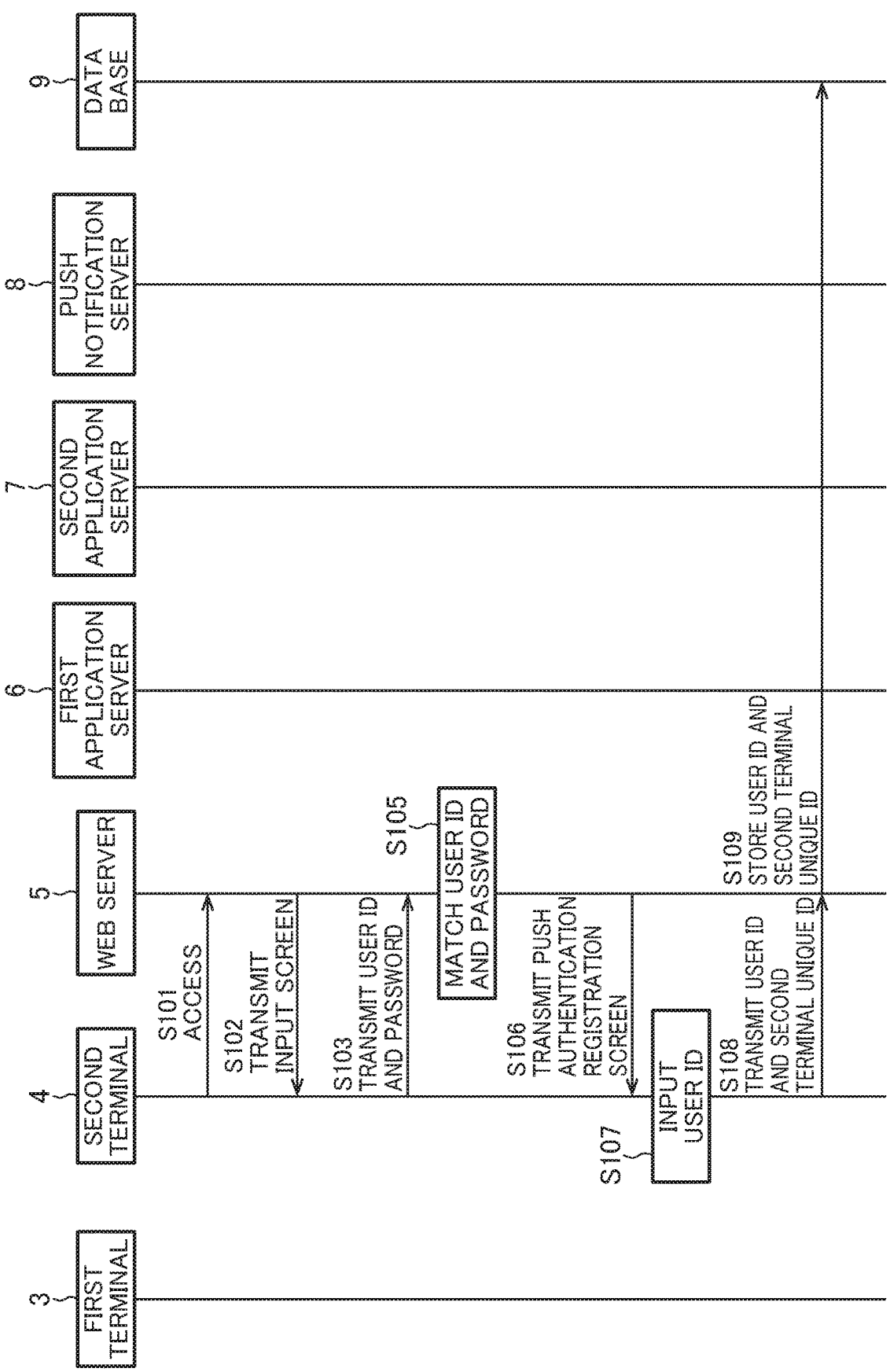

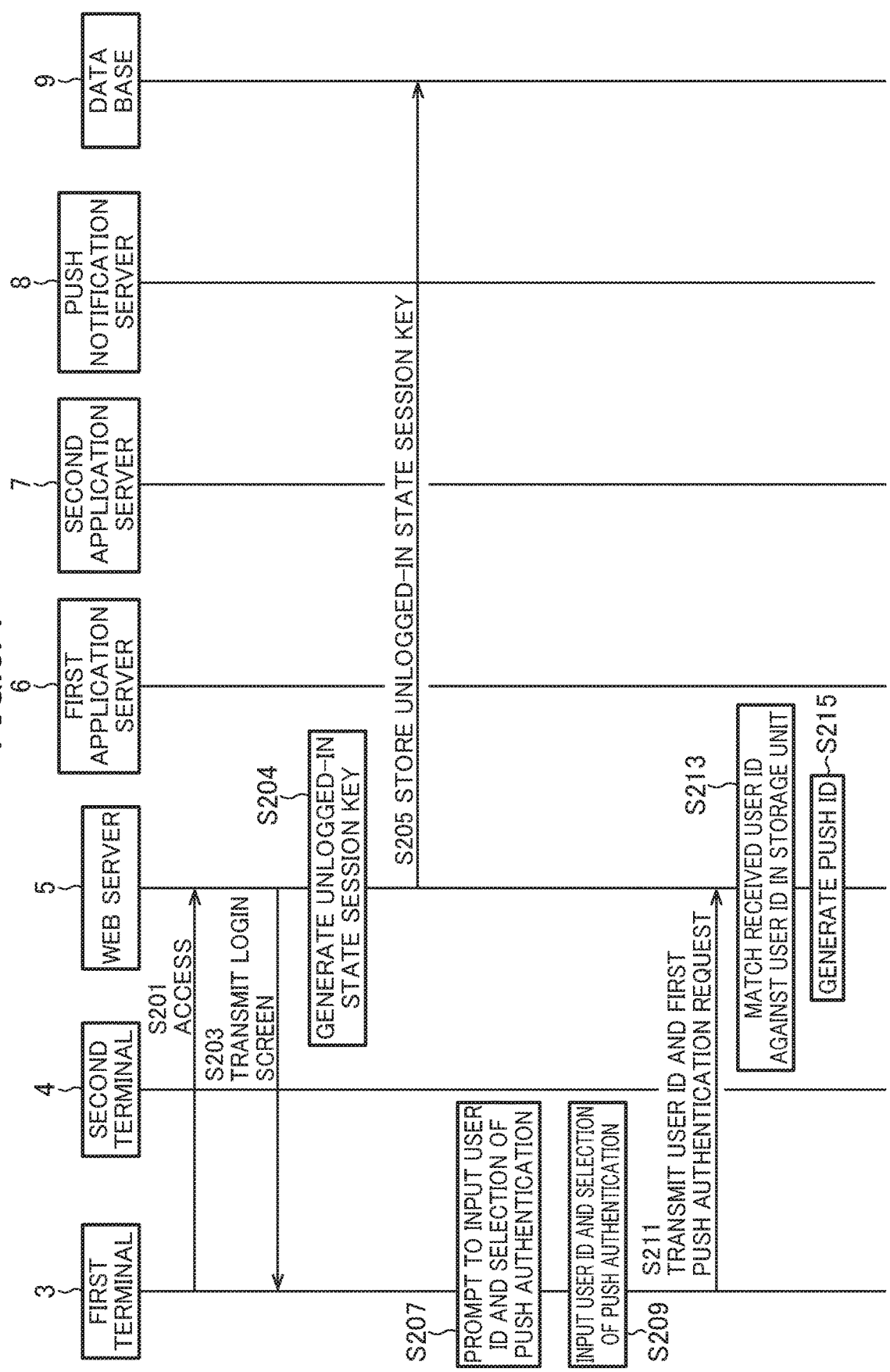

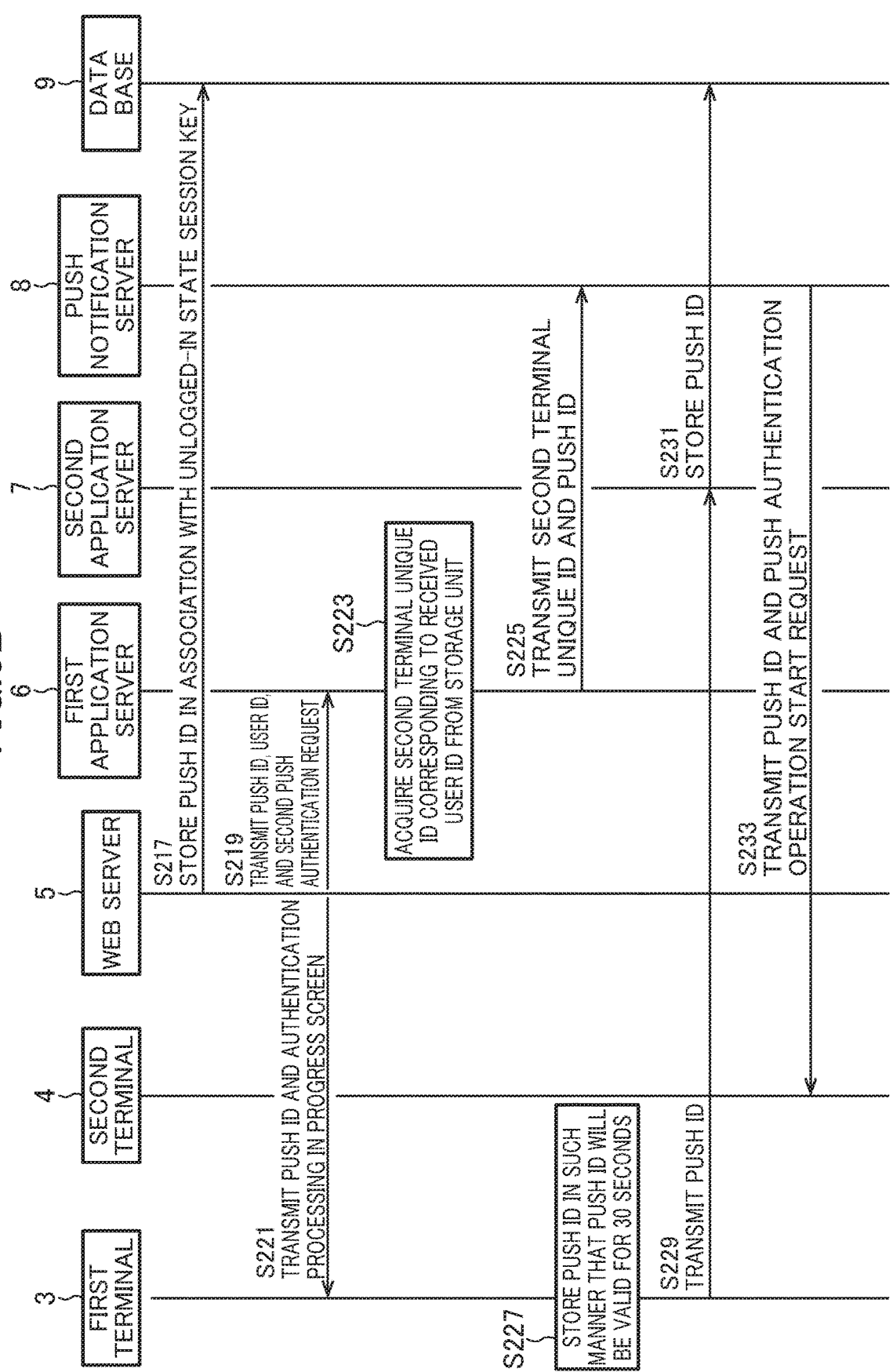

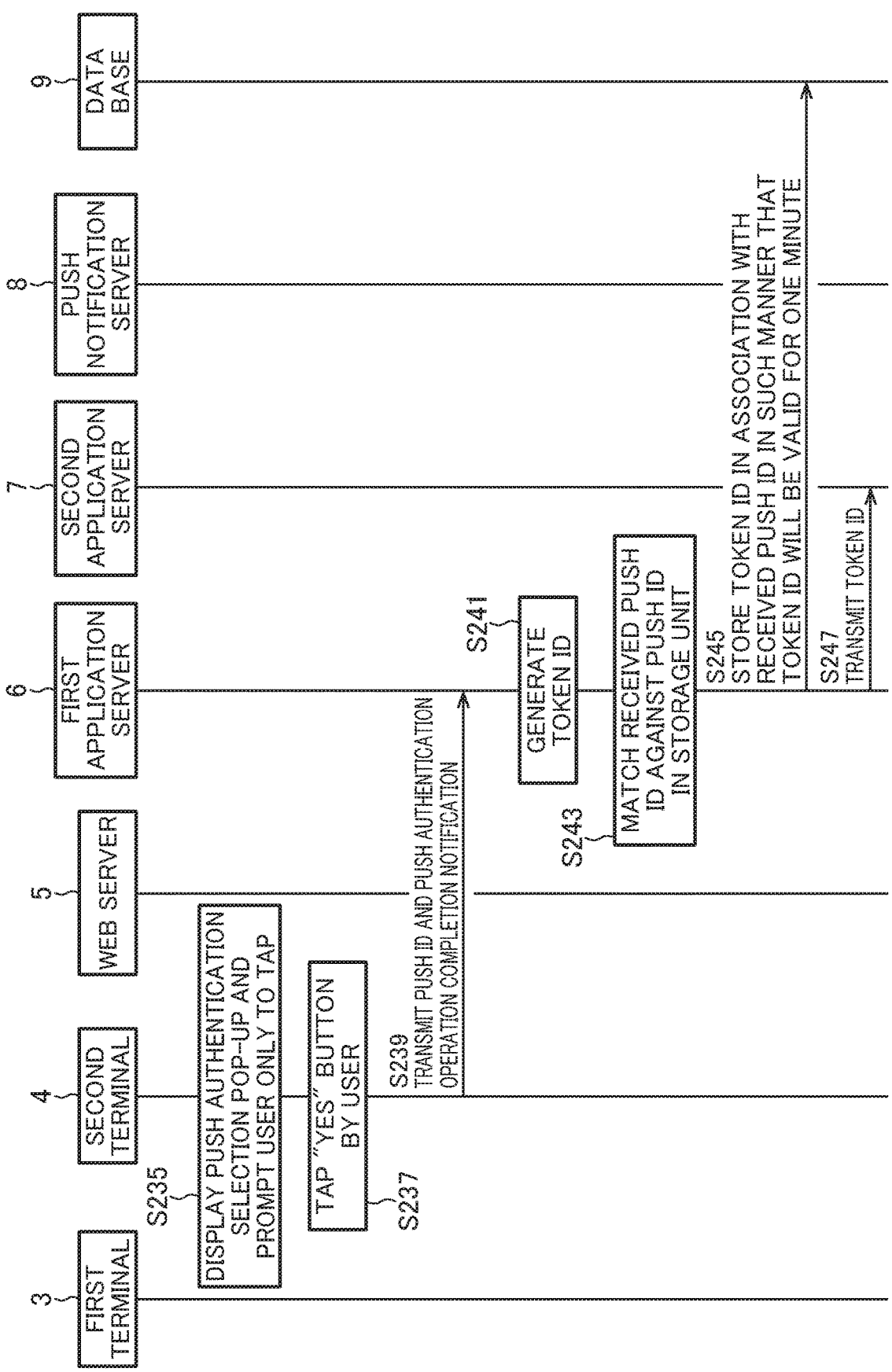

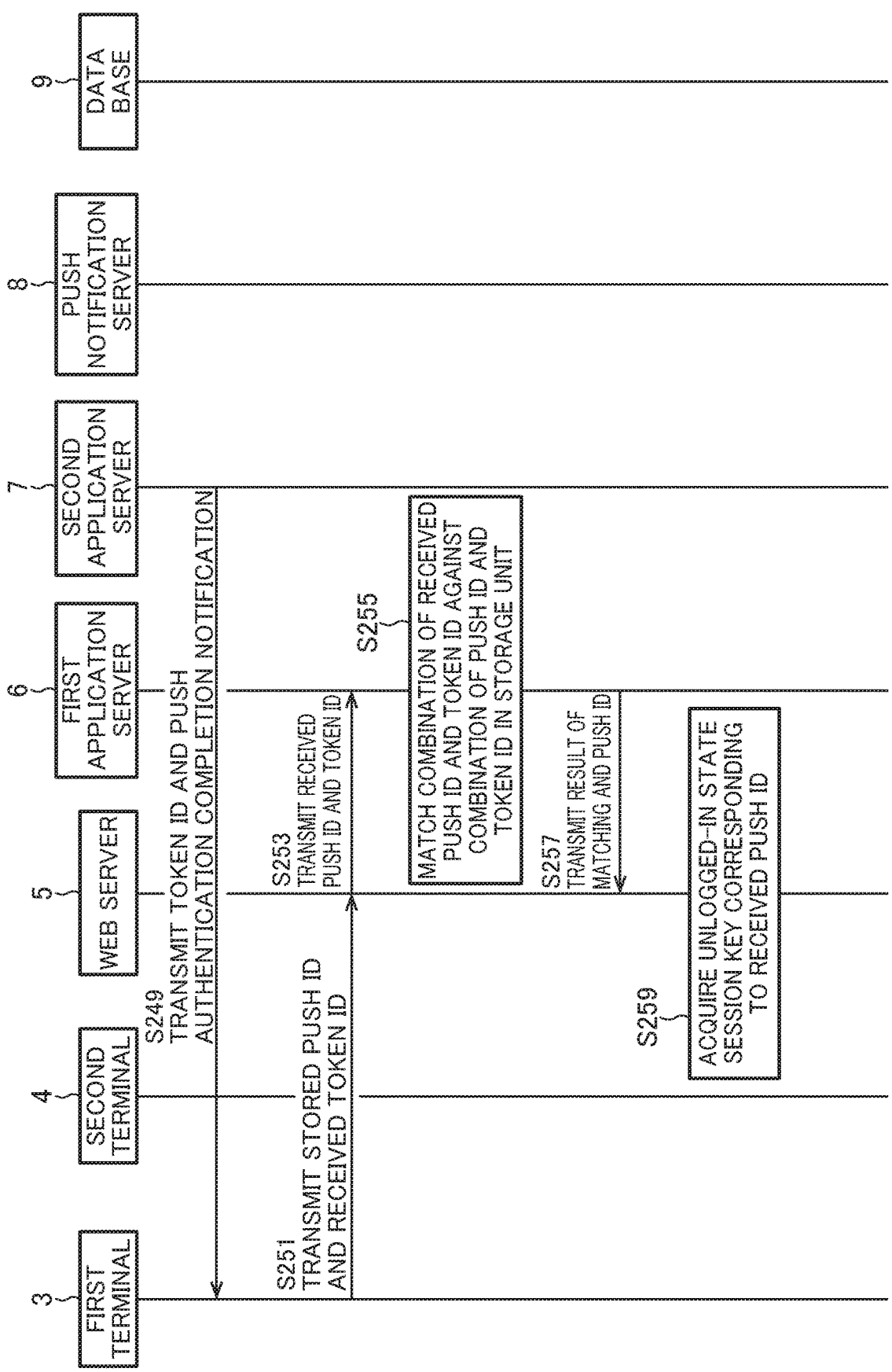

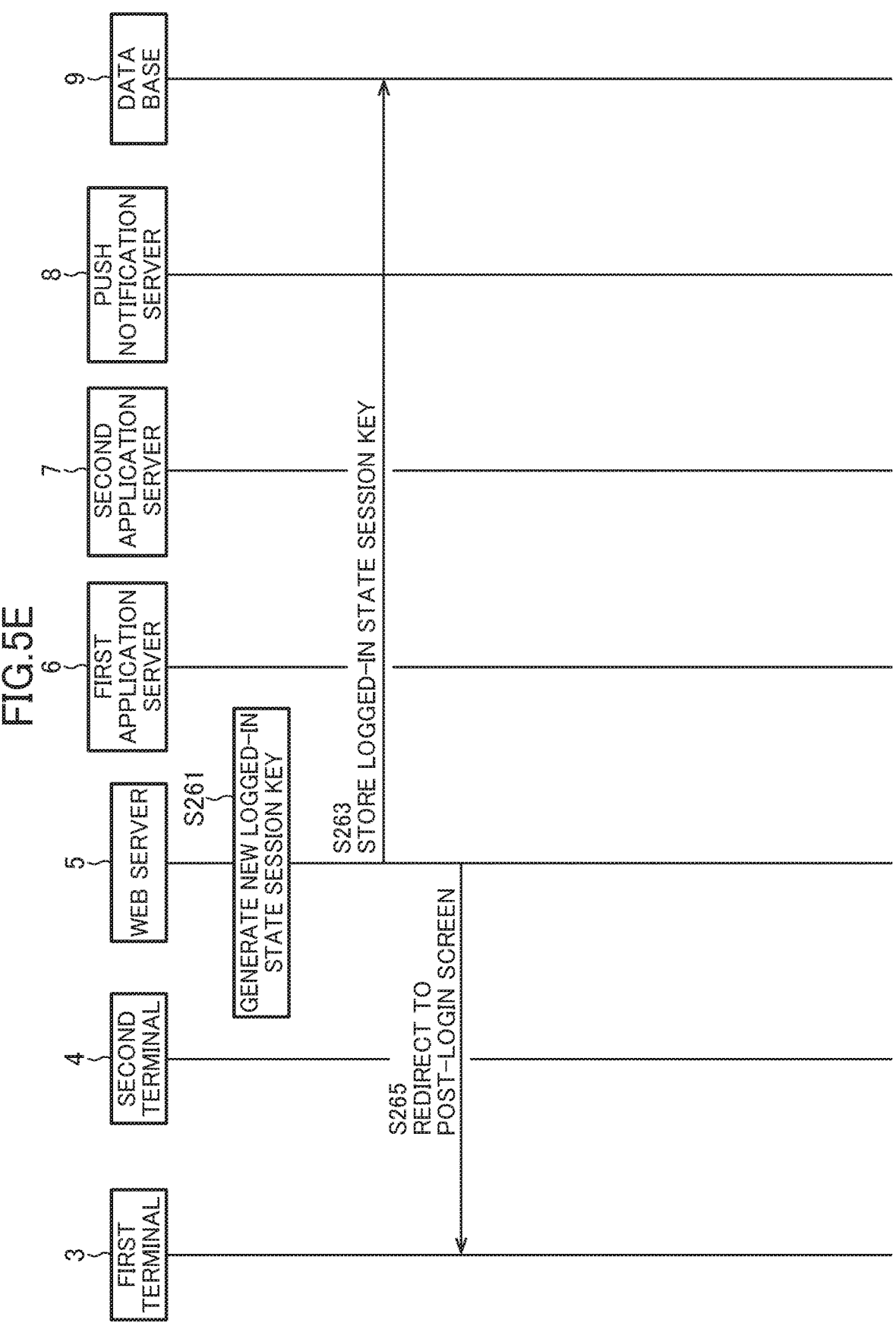

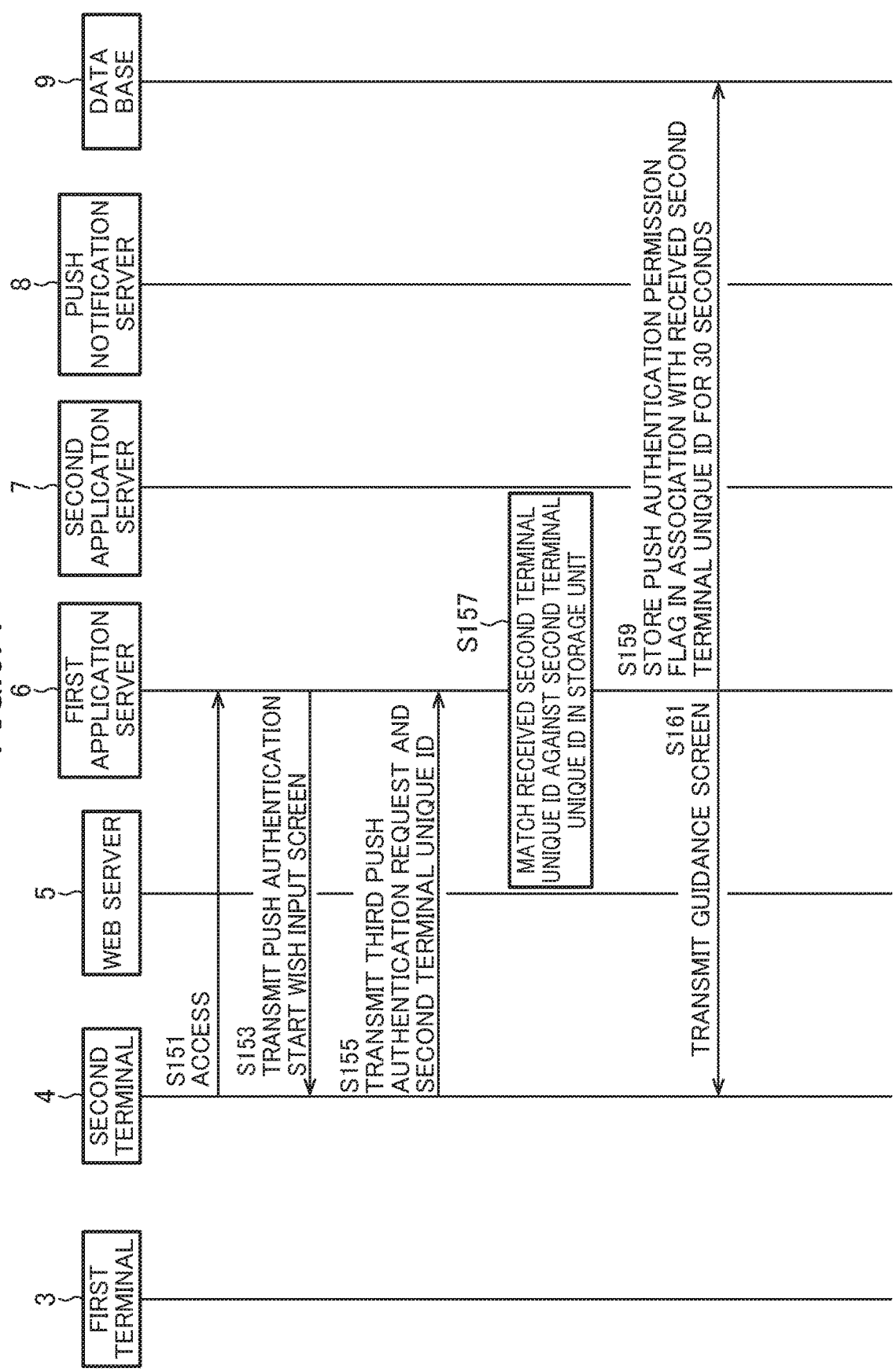

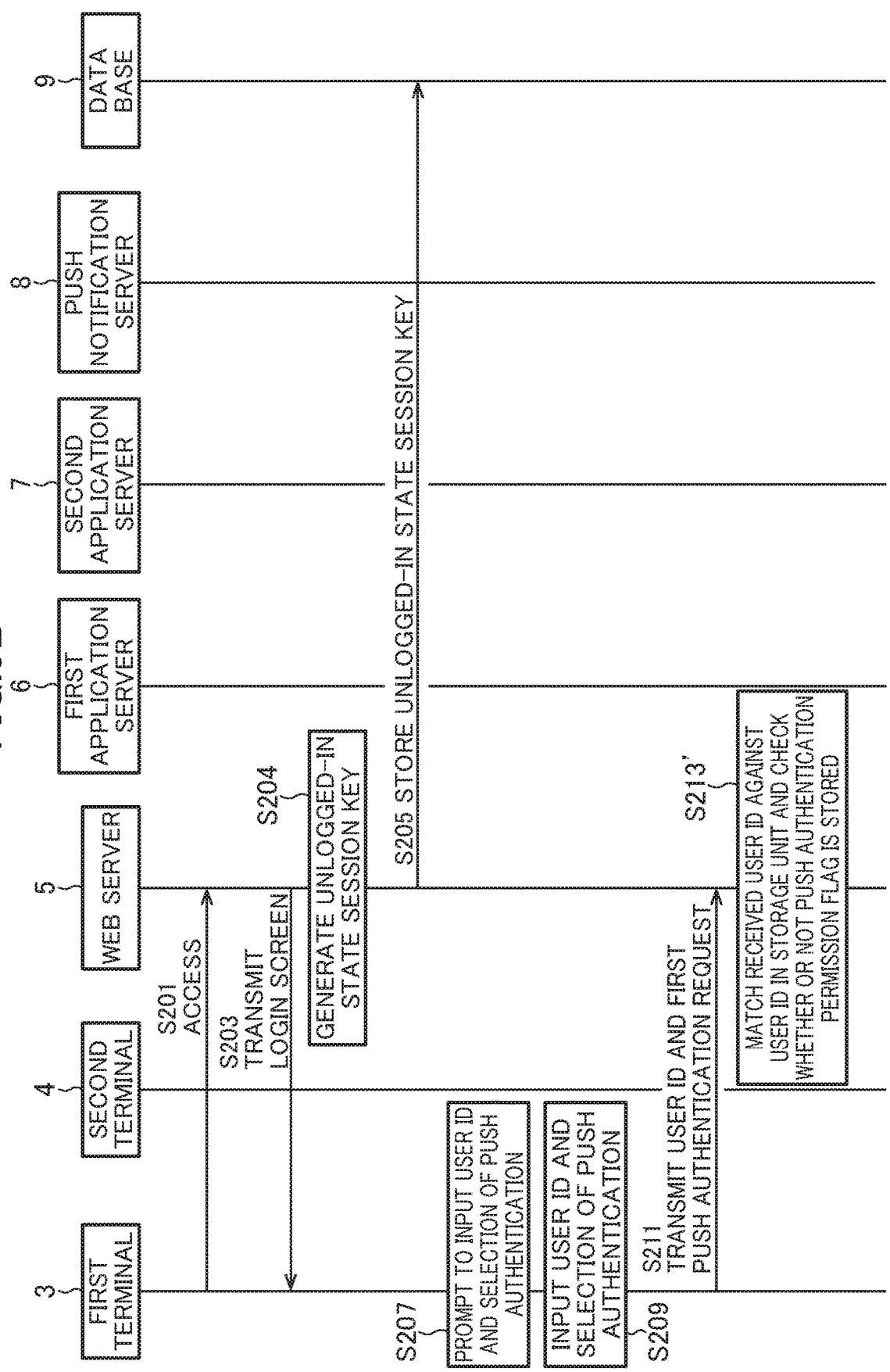

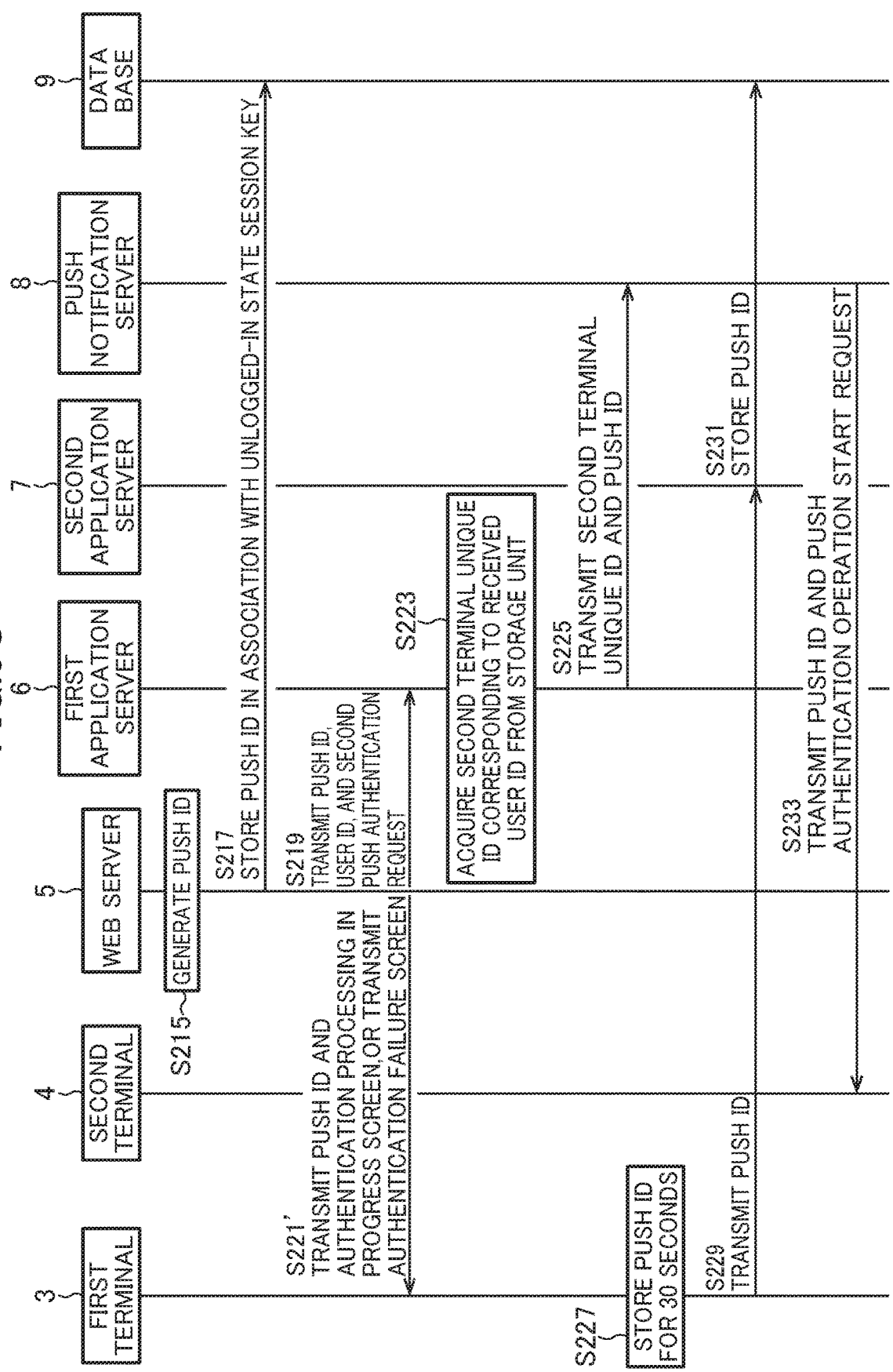

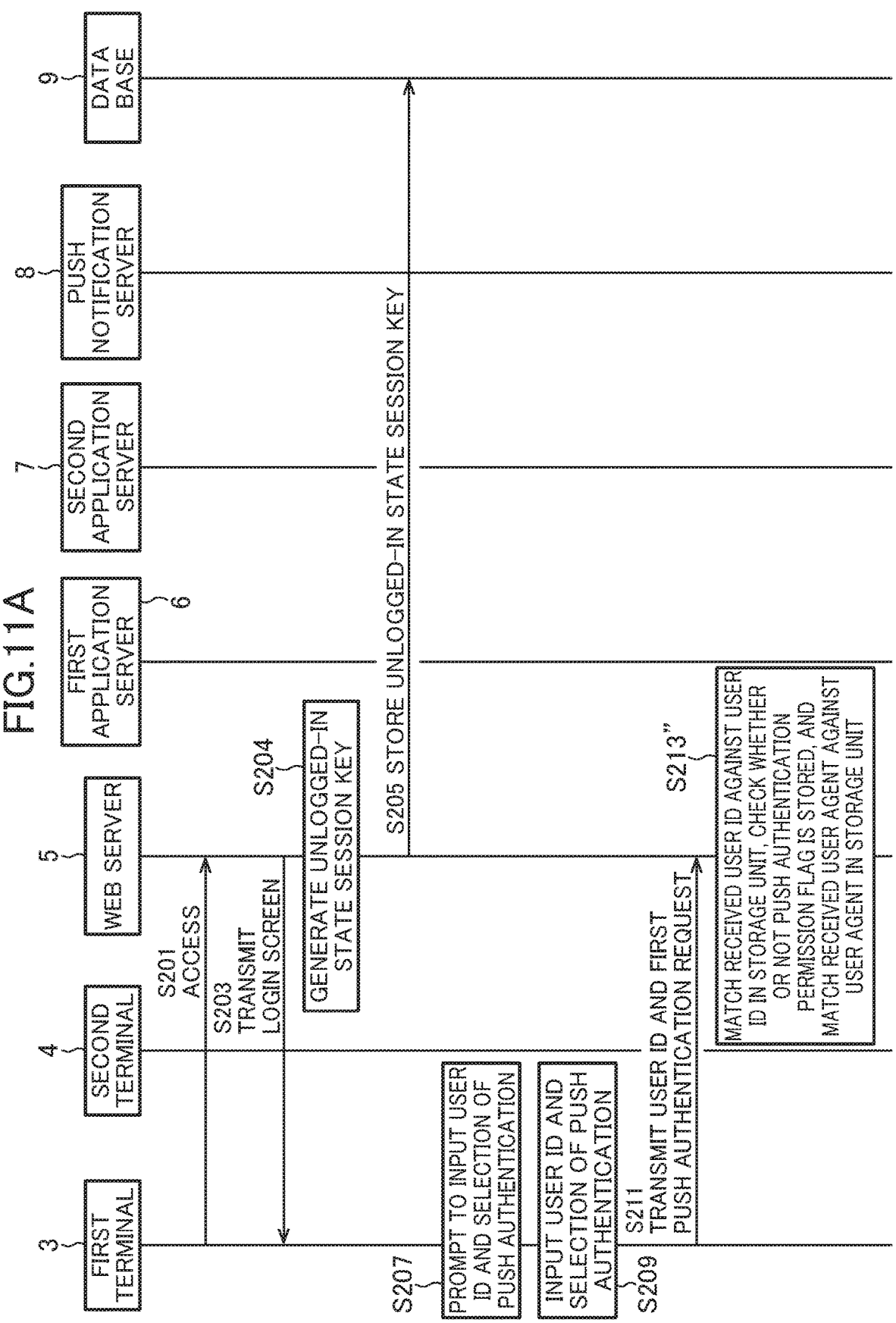

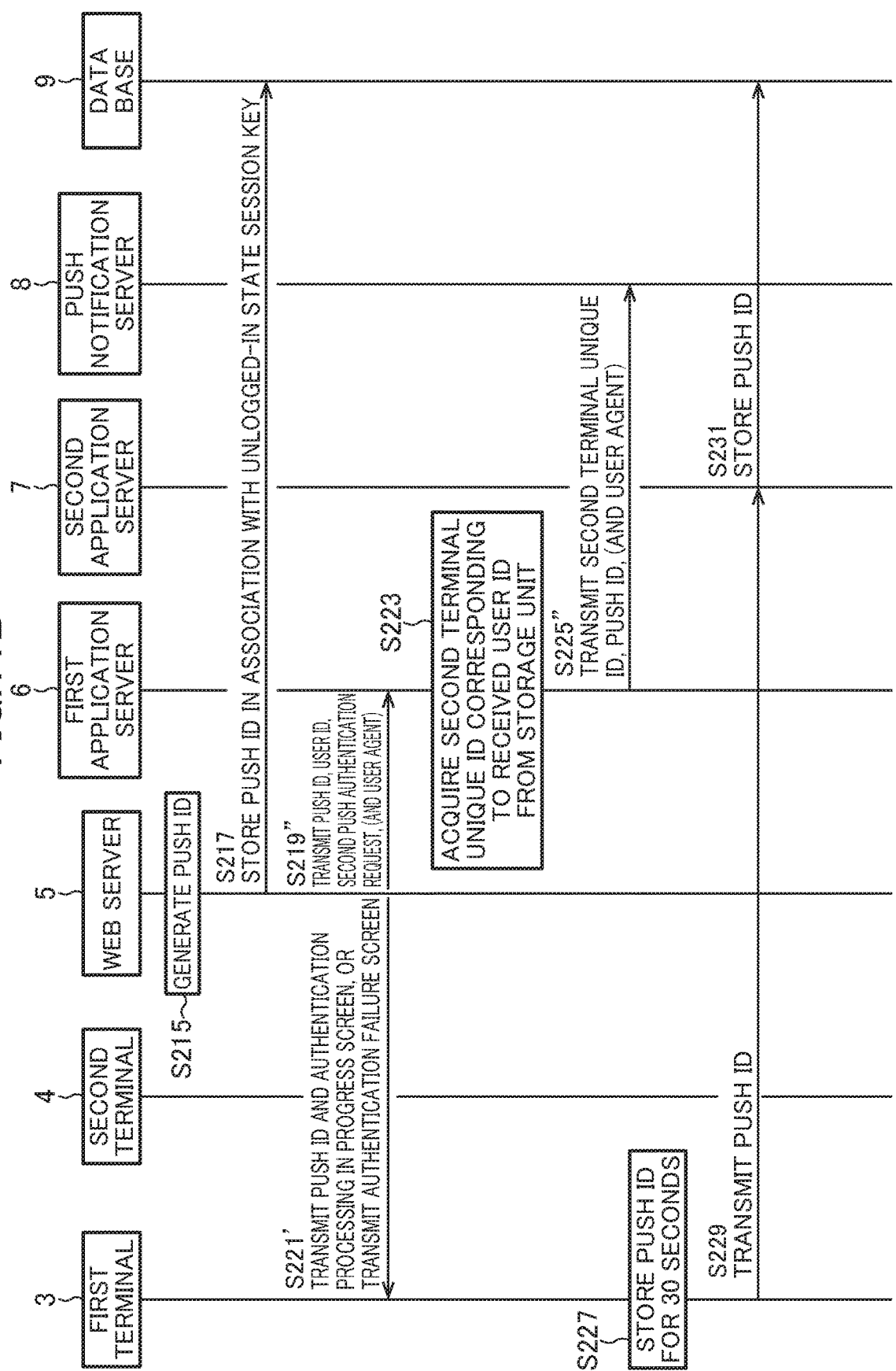

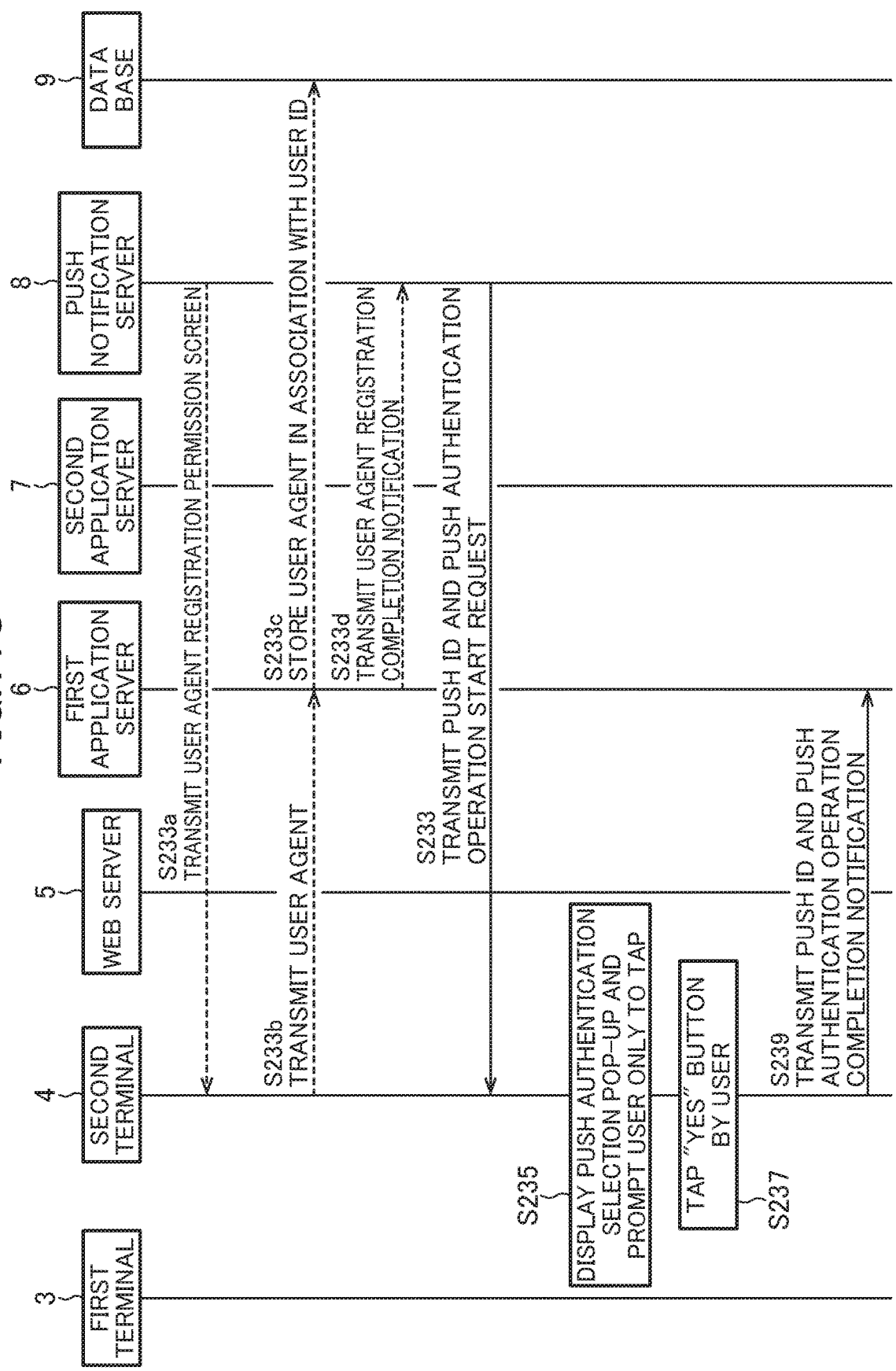

SYSTEM, METHOD, AND RECORDING MEDIUM STORING PROGRAM FOR AUTHENTICATION

TECHNICAL FIELD

The present invention relates to a system, a method, and a recording medium storing the program for authentication.

DESCRIPTION OF RELATED ART

In commonly used authentication methods, it is required to input a password, biometric authentication information, or the like. Among the authentication methods, there are methods of performing authentication in two steps by using two terminals, and in both the steps, it is required to input a password, biometric authentication information, or the like. For example, in an authentication method described in Patent document 1 cited below, it is required to first input an ID and a password on a PC ([0019]), and next input biometric authentication information, such as voice, a face, or a finger print, of a user from an information mobile terminal.

CITATION LIST

Patent Literature

Patent Document 1
  Japanese Patent Laid-Open No. 2015-99470
  However, inputting a password, biometric authentication information, or the like is a burden to a user and takes time and trouble.

SUMMARY

Accordingly, one or more embodiments of the present invention provide an authentication system, a method, and a recording medium storing a program that do not require, at the time of authentication, an input of any of knowledge authentication information except identification information, for example, a user ID or a card ID, ownership authentication information, and biometric authentication information.

One or more embodiments of the present invention provide an authentication system, comprising: a first terminal; a second terminal; and an authentication subsystem, wherein the first terminal transmits identification information inputted into the first terminal and a first request for push authentication to the authentication subsystem, the authentication subsystem matches the identification information received from the first terminal against identification information stored in association with a unique ID of the second terminal and, if the identification information exists that matches the identification information received from the first terminal, transmits a push authentication operation start request to the second terminal, based on the unique ID of the second terminal stored in association with the identification information, and the second terminal, upon receiving the push authentication operation start request, prompts a user, for the push authentication, to perform only a predetermined operation that does not involve inputting of any of knowledge authentication information, ownership authentication information, and biometric authentication information and, when the predetermined operation is performed by the user, transmits a push authentication operation completion notification to the authentication subsystem.

One or more embodiments of the present invention provide an authentication system, comprising: a first terminal; a second terminal; and an authentication subsystem, wherein the authentication subsystem includes: one or more storages; one or more memories that store instructions; and one or more processors that are configured to execute the instructions stored in the one or more memories to: match identification information received from the first terminal against identification information stored in the one or more storages in association with a unique ID of the second terminal; generate a push ID and transmit the push ID to the first terminal if the identification information that matches the identification information received from the first terminal is stored in the one or more storages; acquire, based on the identification information that matches the identification information received from the first terminal, the unique ID of the second terminal stored in the one or more storages in association with the identification information; store the push ID received from the first terminal in the one or more storages; transmit the push ID generated by the push ID generation unit and a push authentication operation start request to the second terminal, based on the unique ID of the second terminal acquired by the second terminal unique ID acquisition unit; receive a push authentication operation completion notification transmitted from the second terminal; and match the push ID received from the second terminal against the push ID from the first terminal stored in the one or more storages, wherein the first terminal transmits the identification information and a first request for push authentication to the authentication subsystem, and stores the push ID received from the authentication subsystem and transmits the push ID to the authentication subsystem, and the second terminal, upon receiving the push authentication operation start request, prompts a user, for the push authentication, to perform only a predetermined operation that does not involve inputting of any of knowledge authentication information, ownership authentication information, and biometric authentication information, and when the predetermined operation is performed by the user, transmits the push ID received from the authentication subsystem and the push authentication operation completion notification to the authentication subsystem.

One or more embodiments of the present invention provide an authentication subsystem comprising: one or more memories that store instructions; and one or more processors that are configured to execute the instructions stored in the one or more memories to: receive identification information and a first request for push authentication transmitted from a first terminal; match the identification information received from the first terminal against identification information stored in association with a unique ID of a second terminal and, if the identification information exists that matches the identification information received from the first terminal, transmitting a push authentication operation start request to the second terminal, based on the unique ID of the second terminal stored in association with the identification information; and receive a push authentication operation completion notification, which is transmitted from the second terminal when a predetermined operation is performed by a user on the second terminal, wherein the second terminal, upon receiving the push authentication operation start request, prompts the user, for the push authentication, to perform only the predetermined operation that does not involve inputting of any of knowledge authentication information, ownership authentication information, and biometric authentication information.

One or more embodiments of the present invention provide an authentication subsystem, comprising: one or more storages; one or more memories that store instructions; and one or more processors that are configured to execute the instructions stored in the one or more memories to: receive identification information and a first request for push authentication transmitted from a first terminal, and match the identification information against identification information stored in the one or more storages in association with a unique ID of a second terminal; generate a push ID and transmit the push ID to the first terminal if the identification information exists that matches the identification information received from the first terminal; acquire, based on the identification information that matches the identification information received from the first terminal, the unique ID of the second terminal stored in the one or more storages in association with the identification information; receive the push ID from the first terminal that stores the push ID received from the authentication subsystem, and store the push ID in the one or more storages; to transmit the push ID generated by the authentication subsystem and a push authentication operation start request to the second terminal, based on the unique ID of the second terminal acquired by the authentication subsystem; and match the push ID received from the second terminal against the push ID from the first terminal stored in the one or more storages.

One or more embodiments of the present invention provide a second terminal comprising: one or more memories that store instructions; and one or more processors that are configured to execute the instructions stored in the one or more memories to: receive a push authentication operation start request, which is transmitted by an authentication subsystem when the authentication subsystem matches identification information inputted into a first terminal and received from the first terminal against identification information stored in association with a unique ID of the second terminal and if the identification information exists that matches the identification information received from the first terminal, wherein the push authentication operation start request is transmitted based on the unique ID of the second terminal stored in association with the identification information; prompt a user in response to the push authentication operation start request, for the push authentication, to perform only a predetermined operation that does not involve inputting of any of knowledge authentication information, ownership authentication information, and biometric authentication information; and transmit a push authentication operation completion notification to the authentication subsystem when the predetermined operation is performed by the user.

One or more embodiments of the present invention provide a second terminal, comprising: one or more memories that store instructions; and one or more processors that are configured to execute the instructions stored in the one or more memories to: receive a push ID and a push authentication operation start request transmitted by an authentication subsystem including one or more storages, wherein the push ID is generated when the authentication subsystem matches identification information inputted into a first terminal and received from the first terminal against identification information stored in the one or more storages in association with a unique ID of the second terminal and if the identification information exists that matches the identification information received from the first terminal, and the push ID and the push authentication operation start request are transmitted based on the unique ID of the second terminal stored in the one or more storages in association with the identification information; prompt a user in response to the push authentication operation start request, for the push authentication, to perform only a predetermined operation that does not involve inputting of any of knowledge authentication information, ownership authentication information, and biometric authentication information; and transmit the push ID received from the authentication subsystem and a push authentication operation completion notification to the authentication subsystem when the predetermined operation is performed by the user, wherein the push ID transmitted to the authentication subsystem is the push ID generated if the identification information exists that matches the identification information received from the first terminal, and is matched against the push ID transmitted to the first terminal, transmitted from the first terminal to the authentication subsystem, and stored in the one or more storages.

One or more embodiments of the present invention provide an authentication method, comprising the steps of: by a first terminal, transmitting identification information inputted into the first terminal and a first request for push authentication to an authentication subsystem; by the authentication subsystem, matching the identification information received from the first terminal against identification information stored in association with a unique ID of a second terminal and, if the identification information exists that matches the identification information received from the first terminal, transmitting a push authentication operation start request to the second terminal, based on the unique ID of the second terminal stored in association with the identification information; by the second terminal, upon receiving the push authentication operation start request, prompting a user, for the push authentication, to perform only a predetermined operation that does not involve inputting of any of knowledge authentication information, ownership authentication information, and biometric authentication information; and by the second terminal, when the predetermined operation is performed by the user, transmitting a push authentication operation completion notification to the authentication subsystem.

One or more embodiments of the present invention provide an authentication method performed among a first terminal, a second terminal, and an authentication subsystem, the authentication method comprising the steps of: by the first terminal, in response to an input of identification information, transmitting the identification information and a first request for push authentication to the identification information matching unit; by the authentication subsystem, matching the identification information received from the first terminal against identification information stored in association with a unique ID of the second terminal; by the authentication subsystem, generating a push ID and transmitting the push ID to the first terminal if the identification information exists that matches the identification information received from the first terminal; by the authentication subsystem, acquiring, based on the identification information that matches the identification information received from the first terminal, the unique ID of the second terminal stored in association with the identification information; by the first terminal, storing the push ID received from the push ID generation unit and transmitting the push ID to the authentication subsystem; by the authentication subsystem, storing the push ID received from the first terminal; by the authentication subsystem, transmitting the push ID generated by the authentication subsystem and a push authentication operation start request to the second terminal, based on the unique ID of the second terminal acquired by the authentication subsystem; by the second terminal, upon receiving the push authentication operation start request, prompting a user, for the push authentication, to perform only a predetermined operation that does not involve inputting of any of knowledge authentication information, ownership authentication information, and biometric authentication information; by the second terminal, when the predetermined operation is performed by the user, transmitting the push ID received from the authentication subsystem and a push authentication operation completion notification to the authentication subsystem; and by the authentication subsystem, matching the push ID received from the second terminal against the stored push ID from the first terminal.

One or more embodiments of the present invention provide an authentication method, comprising the steps of: receiving identification information and a first request for push authentication transmitted from a first terminal; matching the identification information received from the first terminal against identification information stored in association with a unique ID of a second terminal and, if the identification information exists that matches the identification information received from the first terminal, transmitting a push authentication operation start request to the second terminal, based on the unique ID of the second terminal stored in association with the identification information; and receiving a push authentication operation completion notification, which is transmitted from the second terminal when a predetermined operation is performed by a user on the second terminal, wherein the second terminal, upon receiving the push authentication operation start request, prompts the user, for the push authentication, to perform only the predetermined operation that does not involve inputting of any of knowledge authentication information, ownership authentication information, and biometric authentication information.

One or more embodiments of the present invention provide an authentication method performed by an authentication subsystem, the authentication method comprising the steps of: receiving identification information and a first request for push authentication transmitted from a first terminal, and matching the identification information against identification information stored in association with a unique ID of a second terminal; generating a push ID and transmitting the push ID to the first terminal if the identification information exists that matches the identification information received from the first terminal; acquiring, based on the identification information that matches the identification information received from the first terminal, the unique ID of the second terminal stored in association with the identification information; receiving the push ID from the first terminal that stores the push ID received from the authentication subsystem, and storing the push ID; transmitting the generated push ID and a push authentication operation start request to the second terminal, based on the acquired unique ID of the second terminal; and matching the push ID received from the second terminal against the stored push ID from the first terminal.

One or more embodiments of the present invention provide an authentication method, comprising the steps of: receiving a push authentication operation start request, which is transmitted by an authentication subsystem when the authentication subsystem matches identification information inputted into a first terminal and received from the first terminal against identification information stored in association with a unique ID of a second terminal and if the identification information exists that matches the identification information received from the first terminal, wherein the push authentication operation start request is transmitted based on the unique ID of the second terminal stored in association with the identification information; in response to the push authentication operation start request, prompting a user, for the push authentication, to perform only a predetermined operation that does not involve inputting of any of knowledge authentication information, ownership authentication information, and biometric authentication information; and transmitting a push authentication operation completion notification to the authentication subsystem when the predetermined operation is performed by the user.

One or more embodiments of the present invention provide an authentication method, comprising the steps of: receiving a push ID and a push authentication operation start request transmitted by an authentication subsystem including one or more storages, wherein the push ID is generated when the authentication subsystem matches identification information inputted into a first terminal and received from the first terminal against identification information stored in the one or more storages in association with a unique ID of a second terminal and if the identification information exists that matches the identification information received from the first terminal, and the push ID and the push authentication operation start request are transmitted based on the unique ID of the second terminal stored in the one or more storages in association with the identification information; in response to the push authentication operation start request, prompting a user, for the push authentication, to perform only a predetermined operation that does not involve inputting of any of knowledge authentication information, ownership authentication information, and biometric authentication information; and transmitting the push ID received from the authentication subsystem and a push authentication operation completion notification to the authentication subsystem when the predetermined operation is performed by the user, wherein the push ID transmitted to the authentication subsystem is the push ID generated if the identification information exists that matches the identification information received from the first terminal, and is matched against the push ID transmitted to the first terminal, transmitted from the first terminal to the authentication subsystem, and stored in the one or more storages.

In Description and Claims, "server" means one or more servers and also includes what comprises a plurality of servers.

In Description and Claims, "push authentication" means authentication that is performed in such a manner that a second terminal, upon receiving a push notification for authentication in response to an input of identification information into a first terminal, prompts a user to perform only a predetermined operation that does not involve inputting of any of knowledge authentication information, ownership authentication information, and biometric authentication information, and the authentication is performed based on the predetermined operation performed by the user.

According to one or more embodiments of the present invention having any of the configurations described above, it is possible to provide an authentication system, a method, and a program, as well as a recording medium storing the program that do not require, at the time of authentication, an input of any of knowledge authentication information except identification information, for example, a user ID or a card ID, ownership authentication information, and biometric authentication information.

BRIEF DESCRIPTION OF THE DRAWINGS

FIG. 4 is a sequence diagram of an example of processing of registering information required for use of push authentication according to one or more embodiments of the present invention.

FIG. 5A is a sequence diagram of an example of push authentication processing according to one or more embodiments of the present invention.

FIG. 5B is a sequence diagram of the example of push authentication processing according to one or more embodiments of the present invention.

FIG. 5C is a sequence diagram of the example of push authentication processing according to one or more embodiments of the present invention.

FIG. 5D is a sequence diagram of the example of push authentication processing according to one or more embodiments of the present invention.

FIG. 5E is a sequence diagram of the example of push authentication processing according to one or more embodiments of the present invention.

FIG. 9A is a part of a sequence diagram of an example of push authentication processing according to one or more embodiments of the present invention.

FIG. 9B is a part of the sequence diagram of the example of push authentication processing according to one or more embodiments of the present invention.

FIG. 9C is a part of the sequence diagram of the example of push authentication processing according to one or more embodiments of the present invention.

FIG. 11A is a part of a sequence diagram of an example of push authentication processing according to one or more embodiments of the present invention.

FIG. 11B is a part of the sequence diagram of the example of push authentication processing according to one or more embodiments of the present invention.

FIG. 11C is a part of the sequence diagram of the example of push authentication processing according to one or more embodiments of the present invention.

DETAILED DESCRIPTION OF EMBODIMENTS

Hereinafter, embodiments of the present invention will be described with reference to drawings.

Figure 1:
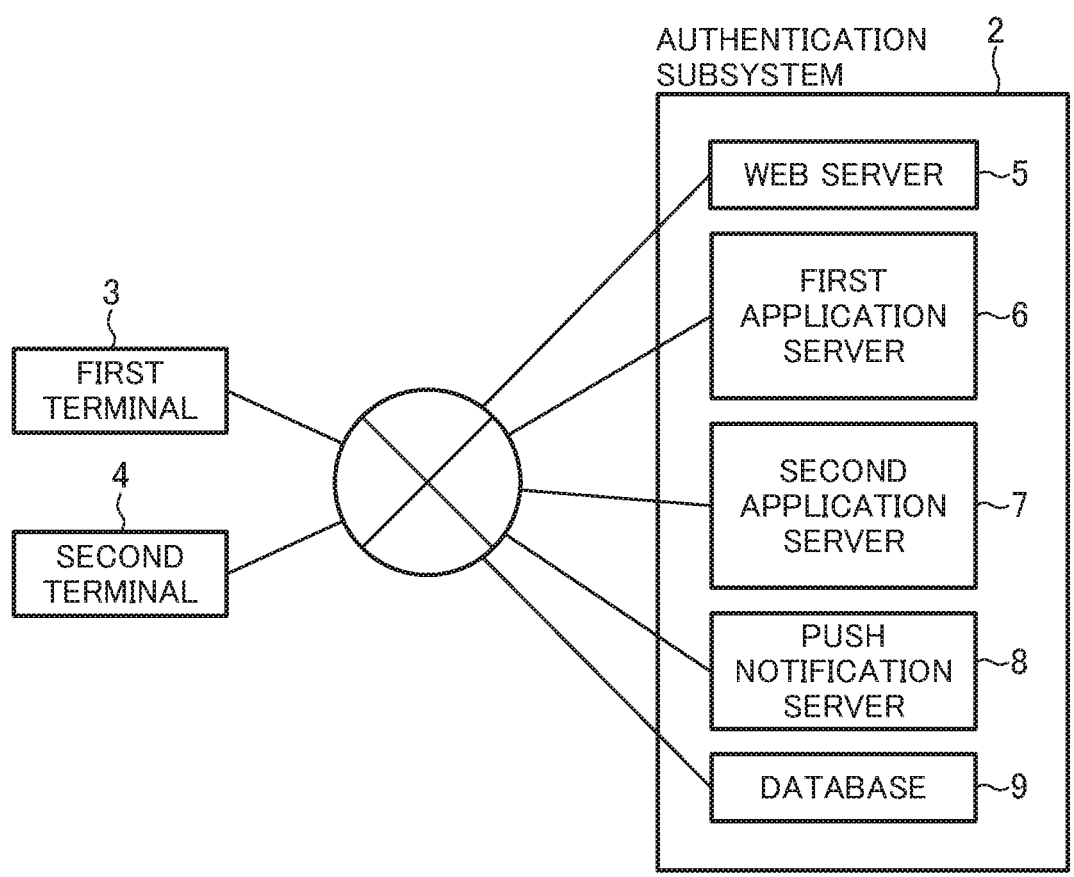
FIG. 1 is a schematic diagram of an authentication system according to one or more embodiments of the present invention.
Figure 2:
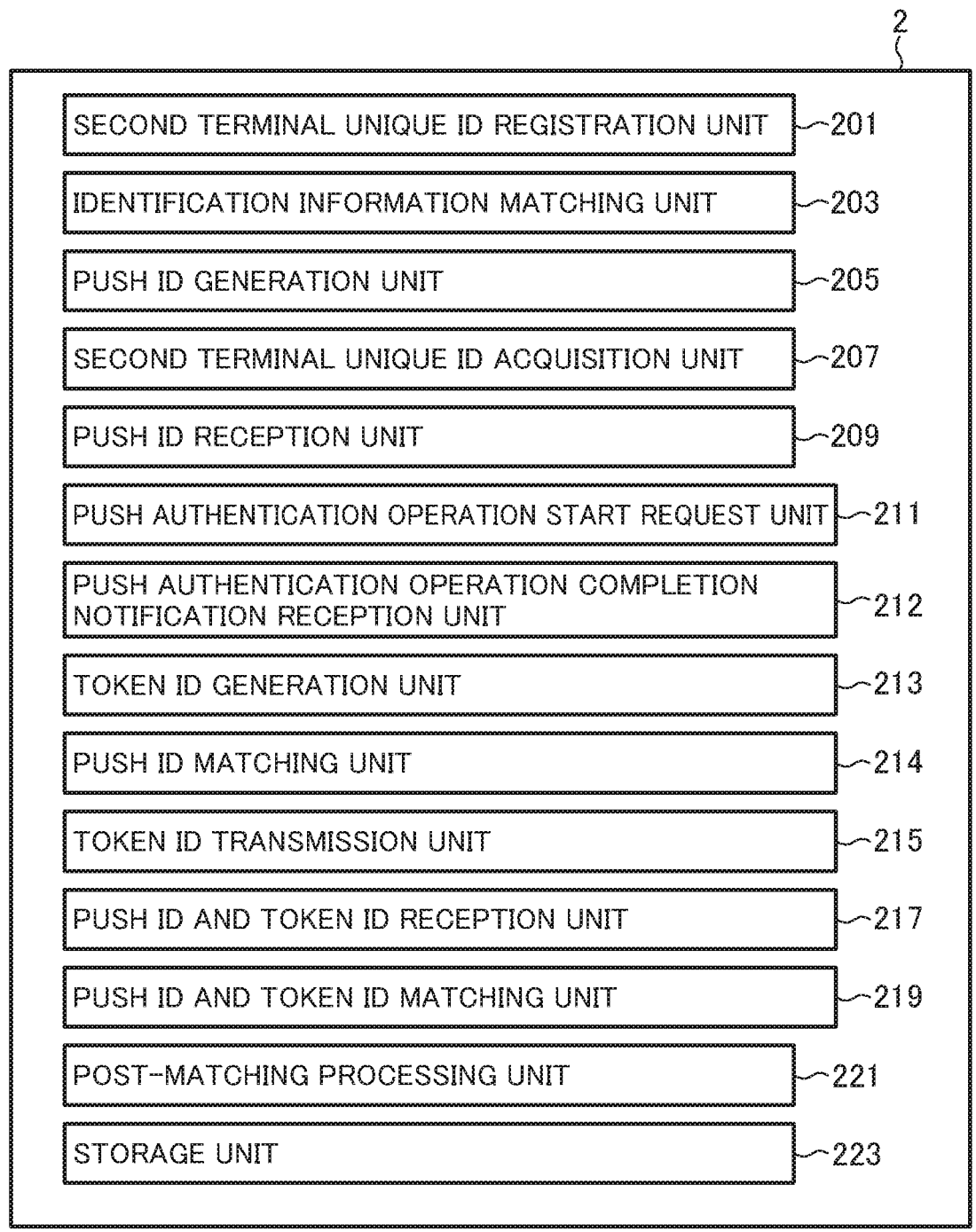
FIG. 2 shows a functional configuration of an authentication subsystem according to one or more embodiments of the present invention.
Figure 3:
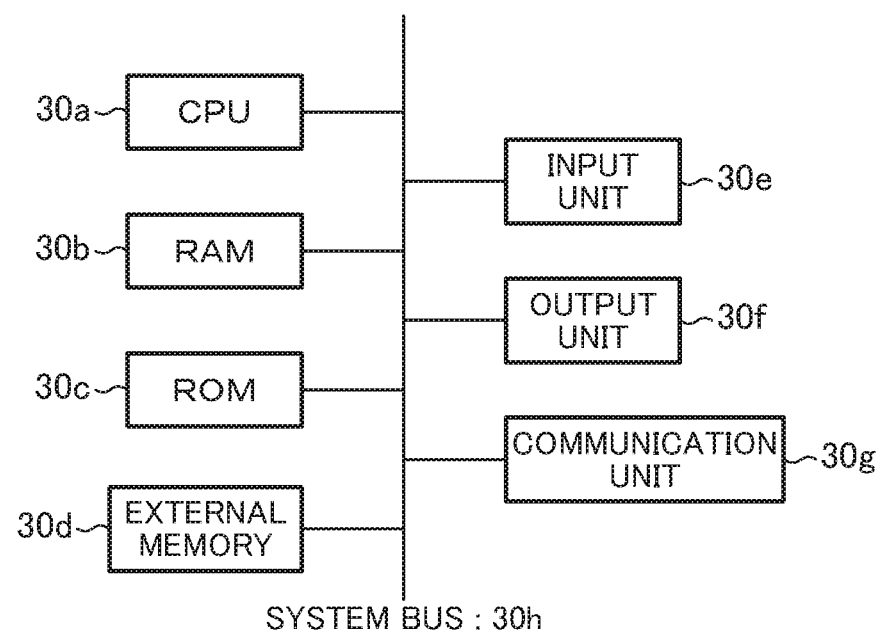
FIG. 3 shows a hardware configuration of a first terminal according to one or more embodiments of the present invention.

FIG. 1 shows an entire configuration of an authentication system according to one or more embodiments of the present invention. FIG. 2 shows a functional configuration of an authentication subsystem according to one or more embodiments of the present invention. FIG. 3 shows a hardware configuration of the first terminal according to one or more embodiments of the present invention. An authentication system 1 includes a first terminal 3, a second terminal 4, a Web server 5, a first application server 6, a second application server 7 capable of asynchronous communication, and a push notification server 8, which are connected to each other via a network 20. The Web server 5, the first application server 6, the second application server 7, and the push notification server 8 are included in an authentication subsystem 2. Each of the authentication subsystem 2, the first terminal 3, the second terminal 4, the Web server 5, the first application server 6, the second application server 7, and the push notification server 8 does not need to be configured as one physical apparatus, and may be configured with a plurality of physical apparatuses.

For the first terminal 3, any appropriate terminal may be used, such as a PC, a smartphone, a tablet terminal, a terminal including an IC card reader/writer, or a terminal capable of communicating with a mobile terminal.

The second terminal 4 is, typically, a mobile terminal such as a smartphone, a tablet terminal, or a mobile telephone, but any appropriate terminal such as a PC may also be used.

The authentication subsystem 2 includes a second terminal unique ID registration unit 201, an identification information matching unit 203, a push ID generation unit 205, a second terminal unique ID acquisition unit 207, a push ID reception unit 209, a push authentication operation start request unit 211, a push authentication operation completion notification reception unit 212, a token ID generation unit 213, a push ID matching unit 214, a token ID transmission unit 215, a push ID and token ID reception unit 217, a push ID and token ID matching unit 219, a post-matching processing unit 221, and a storage unit 223.

The second terminal unique ID registration unit 201 stores identification information and a second terminal unique ID that are received from the second terminal 4 in the storage unit 223 in association with each other. Here, the identification information and the second terminal unique ID may be stored in the storage unit 223 in such a manner that the identification information and the second terminal unique ID are directly associated, or in such a manner that the identification information and the second terminal unique ID are indirectly associated through a table in which the identification information and another type of identification information are associated with each other and a table in which the other type of identification information and the second terminal unique ID are associated with each other.

The identification information matching unit 203 matches identification information received from the first terminal 3 against the identification information stored in the storage unit 223.

If the identification information that matches the identification information received from the first terminal 3 is stored in the storage unit 223, the push ID generation unit 205 generates a push ID and transmits the push ID to the first terminal 3.

Based on the identification information that matches the identification information received from the first terminal 3, the second terminal unique ID acquisition unit 207 acquires the second terminal unique ID that is stored in the storage unit 223 in association with the identification information.

The push ID reception unit 209 stores a push ID received from the first terminal 3 in the storage unit 223.

Based on the second terminal unique ID acquired by the second terminal unique ID acquisition unit 207, the push authentication operation start request unit 211 transmits the push ID generated by the push ID generation unit 205 and a push authentication operation start request to the second terminal 4.

The push authentication operation completion notification reception unit 212 receives a push authentication operation completion notification transmitted from the second terminal 4.

The token ID generation unit 213 generates a token ID when the push authentication operation completion notification reception unit 212 receives the push authentication operation completion notification.

The push ID matching unit 214 matches a push ID received from the second terminal 4 against the push ID from the first terminal 3 stored in the storage unit 223 and, if the push ID exists that matches the push ID received from the second terminal 4, stores the token ID in the storage unit 223 in association with the push ID received from the second terminal 4 in such a manner that the token ID will be valid only for a predetermined short time. Here, the configuration of "storing the token ID in such a manner that the token ID will be valid" may be a configuration in which the stored token ID will be deleted after the predetermined short time, or may be a configuration in which a validity period of the token ID is the predetermined short time.

The token ID transmission unit 215 transmits the token ID generated by the token ID generation unit 213 and a push authentication completion notification to the first terminal 3.

The push ID and token ID reception unit 217 receives the push ID and the token ID from the first terminal 3.

The push ID and token ID matching unit 219 matches a combination of the push ID and the token ID received from the first terminal 3 against a combination of the push ID and the token ID stored in the storage unit 223.

The post-matching processing unit 221 performs processing according to a result of the matching by the push ID and token ID matching unit 219.

The storage unit 223 stores various types of information, such as the identification information, the second terminal unique ID, the push ID, the token ID, an unlogged-in state session key, and a logged-in state session key, and stores the various types of information in association with each other if necessary. The storage unit 223 may be configured as a single physical device, or may be deployed as a plurality of physical devices in a distributed manner.

The first terminal 3 transmits inputted identification information and a first push authentication request to the identification information matching unit 203. The first terminal 3 stores a push ID received from the push ID generation unit 205 in such a manner that the push ID will be valid only for a predetermined short time, and transmits the push ID to the push ID reception unit 209. When the first terminal 3 receives a push authentication completion notification, the first terminal 3 transmits to the push ID and token ID reception unit 217 the push ID stored in the first terminal 3 and a token ID received from the token ID transmission unit 215. Here, the configuration of "storing a push ID in such a manner that the push ID will be valid" may be, similarly to the configurations mentioned above, a configuration in which the stored push ID will be deleted after the predetermined short time, or may be a configuration in which a validity period of the push ID is the predetermined short time.

The second terminal 4 transmits identification information inputted into the second terminal 4 and a unique ID of the second terminal 4 to the second terminal unique ID registration unit 201. When the second terminal 4 receives a push authentication operation start request, the second terminal 4 prompts a user, for push authentication, to perform only a predetermined operation that does not involve inputting of any of knowledge authentication information, ownership authentication information, and biometric authentication information. When the predetermined operation is performed by the user, the second terminal 4 transmits a push ID received from the push authentication operation start request unit 211 and a push authentication operation completion notification to the push authentication operation completion notification reception unit 212.

The Web server 5 includes the second terminal unique ID registration unit 201, the user ID matching unit 203, the push ID generation unit 205, the push ID and token ID reception unit 217, and the post-matching processing unit 221 of the authentication subsystem 2.

The first application server 6 includes the second terminal unique ID acquisition unit 207, the push authentication operation completion notification reception unit 212, the token ID generation unit 213, the push ID matching unit 214, and the push ID and token ID matching unit 219 of the authentication subsystem 2.

The second application server 7 includes the push ID reception unit 209 and the token ID transmission unit 215 of the authentication subsystem 2.

The push notification server 8 includes the push authentication operation start request unit 211 of the authentication subsystem 2.

The database 9 includes the storage unit 223 of the authentication subsystem 2.

FIG. 3 shows an example of the hardware configuration of the first terminal 3 according to one or more embodiments. The first terminal 3 includes a CPU 30a, a RAM 30b, a ROM 30c, an external memory 30d, an input unit 30e, an output unit 30f, and a communication unit 30g. The RAM 30b, the ROM 30c, the external memory 30d, the input unit 30e, the output unit 30f, and the communication unit 30g are connected to the CPU 30a through a system bus 30h.

The CPU 30a performs overall control of each device connected to the system bus 30h.

The ROM 30c and the external memory 30d store BIOS and OS, which are control programs for the CPU 30a, and various programs, data, and the like required to implement functions to be executed by a computer.

The RAM 30b functions as a main memory, a work area, and the like for the CPU. The CPU 30a implements various operations by loading a program and the like required when performing processing into the RAM 30b from the ROM 30c and the external memory 30d, and executing the loaded program.

The external memory 30d includes, for example, a flash memory, a hard disk, a DVD-RAM, a USB memory, and the like.

The input unit 30e receives an instruction for an operation and the like from the user or the like. The input unit 30e includes input devices, for example, an input button, a keyboard, a pointing device, a wireless remote controller, a microphone, a camera, and the like.

The output unit 30f outputs data to be processed by the CPU 30a and data to be stored in the RAM 30b, the ROM 30c, and the external memory 30d. The output unit 30f includes output devices, for example, a CRT display, an LCD, an organic EL panel, a printer, a speaker, and the like.

The communication unit 30g is an interface for connecting to and communicating with external equipment via a network or directly. The communication unit 30g includes interfaces, for example, a serial interface, a LAN interface, and the like.

The second terminal 4, the Web server 5, the first application server 6, the second application server 7, and the push notification server 8 have similar hardware configurations.

Each unit of the authentication subsystem 2 shown in FIG. 2 is implemented in such a manner that the various programs stored in the ROM and the external memory use the CPU, the RAM, the ROM, the external memory, the input unit, the output unit, the communication unit, and the like for resources.

Premised on the above-described system configuration, an example of authentication processing in the authentication system according to one or more embodiments of the present invention will be described below with reference to FIGS. 4 to 7 and the like.

<Registration of Information Required for Use of Push Authentication>

FIG. 4 is a sequence diagram of an example of processing of registering information required for use of push authentication that is an authentication method of one or more embodiments of the present invention.

The user makes access to the Web server 5 from the second terminal 4 (S101). Then, an input screen to input a user ID, which is identification information, and a password is transmitted from the Web server 5 to the second terminal 4 (S102). When the user inputs the user ID and the password, the user ID and the password are transmitted to the Web server 5 (S103). If the user ID and the password are successfully matched (S105), a push authentication registration screen is transmitted from the Web server 5 to the second terminal 4 (S106). When the user inputs the user ID (S107), the second terminal 4 generates a unique ID of the second terminal 4 and transmits the user ID and the unique ID of the second terminal 4 to the Web server 5 (S107). The Web server 5 stores the received user ID and the received unique ID of the second terminal 4 in the database 9 (storage unit 223) in association with each other (S109). The generation of the unique ID of the second terminal 4 may be performed by the Web server 5.

<Push Authentication>

Figure 6:
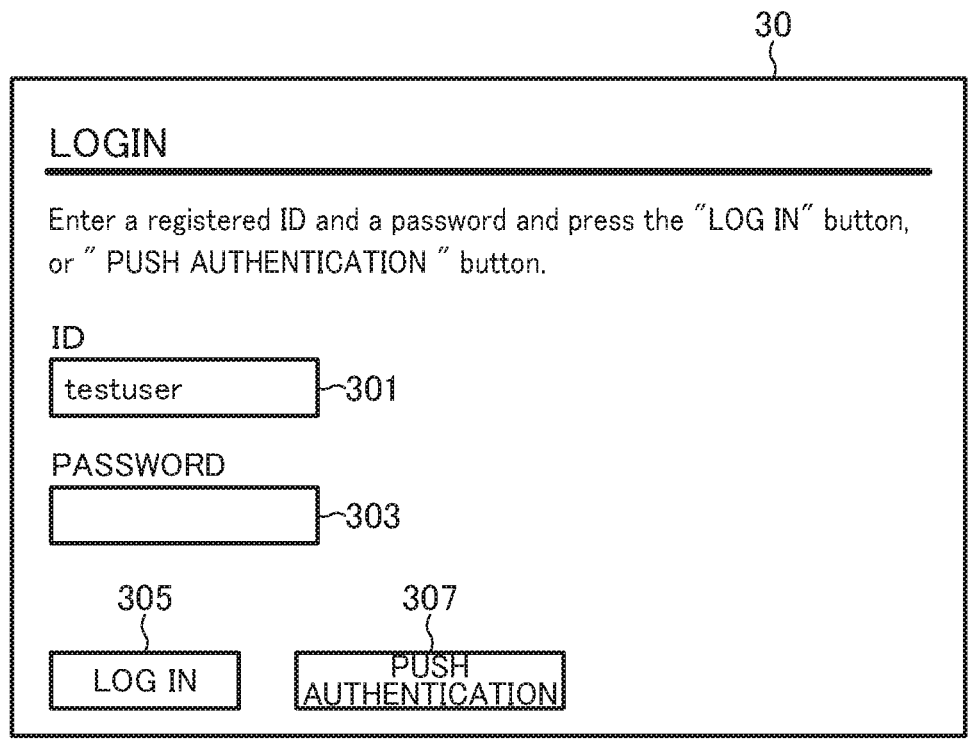
FIG. 6 shows an example of a login screen according to one or more embodiments of the present invention.
Figure 7:
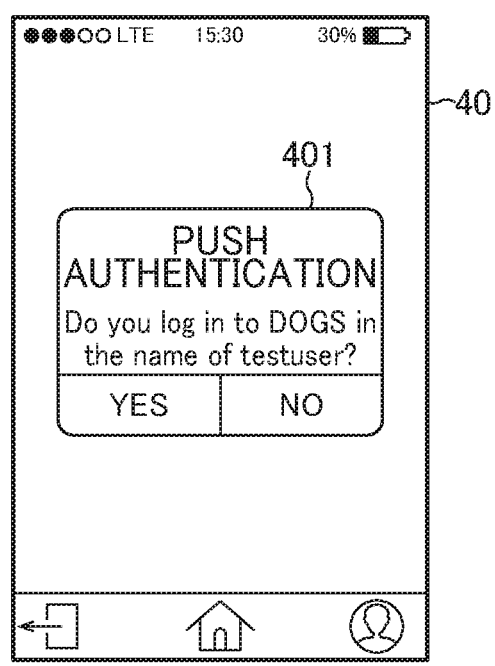
FIG. 7 shows an example of a push authentication operation screen according to one or more embodiments of the present invention.

FIGS. 5A to 5E are sequence diagrams of an example of push authentication processing. FIG. 6 shows an example of a login screen. FIG. 7 shows an example of a push authentication operation screen.

The user makes access to the Web server 5 from the first terminal 3 (S201). Then, a login screen 30 is transmitted from the Web server 5 to the first terminal 3 (S203), and the first terminal 3 displays the login screen.

Meanwhile, the Web server 5 generates an unlogged-in state session key (S204) and stores the unlogged-in state session key in the database 9 (storage unit 223) (S205).

In the login screen 30, a user ID input field 301, a password input field 303, a log in button 305, and a push authentication button 307 are displayed, and the user is prompted to input the user ID and a selection of an authentication method, which is either push authentication or password authentication that is non-push authentication (S207).

When the user inputs the user ID into the user ID input field 301 (S209) and selects push authentication by pressing the push authentication button 307, the first terminal 3 transmits the user ID and a first push authentication request to the Web server 5 (S211). Here, in place of the configuration of inputting a selection of an authentication method, which is either push authentication or non-push authentication, a configuration may be made such that only push authentication can be performed, for example, by displaying the user ID input field and only the push authentication button, or the like.

The Web server 5 (identification information matching unit 203) matches the user ID received from the first terminal against the user ID stored in the database 9 (storage unit 223) in step S105 (S213). If the user ID exists that matches the user ID received from the first terminal 3, the Web server 5 (push ID generation unit 205) generates a push ID (S215). Then, the Web server 5 stores the generated push ID in the database 9 (storage unit 223) in association with the unlogged-in state session key stored in the database 9 (storage unit 223) (S217). The Web server 5 (push ID generation unit 205) transmits the push ID, the user ID, and a second push authentication request to the first application server 6 (S219). At the same time, the Web server 5 (push ID generation unit 205) transmits the push ID and a screen indicating that authentication processing is in progress to the first terminal 3 (S221). At this time, the push ID may be embedded in the screen indicating that authentication processing is in progress. Here, the push ID may be generated by another server at another appropriate timing.

Upon receiving the second push authentication request from the Web server 5, the first application server 6 (second terminal unique ID acquisition unit 207) acquires, based on the user ID received along with the second push authentication request, the unique ID of the second terminal 4 that is stored in the database 9 (storage unit 223) in association with the user ID (S223), and transmits the unique ID of the second terminal 4 and the push ID received along with the second push authentication request to the push notification server 8 (S225).

Meanwhile, the first terminal 3 stores the push ID received from the Web server 5 in such a manner that the push ID will be valid only for a predetermined short time, for example, 30 seconds (S227), and transmits the received push ID to the second application server 7 by asynchronous communication (S229). For a scheme of the asynchronous communication, any appropriate scheme such as Websocket may be used. By using the asynchronous communication, it is possible to reduce a wait load on the Web server 5.

The second application server 7 (push ID reception unit 209) stores the push ID received from the first terminal 3 in the storage unit 223 (S231).

The push notification server 8 (push authentication operation start request unit 211) transmits the push ID received from the first application server 6 and a push authentication operation start request to the second terminal 4, based on the unique ID of the second terminal 4 received from the first application server 6 (S233).

When the second terminal 4 receives the push authentication operation start request, the received push authentication operation start request triggers activation of application software that supports push notification stored in the second terminal 4, whereby the second terminal 4 displays in a display screen 40 a push authentication selection pop-up 401, in which it is selected by tapping a "YES" button or a "NO" button whether or not logging in through push authentication is wished, and prompts the user only to make a tap, which is the predetermined operation that does not involve inputting of any of knowledge authentication information, ownership authentication information, and biometric authentication information, for push authentication (S235). Here, for the push notification to the second terminal, a push notification that is not a conventional scheme using a push electronic mail may be used. For example, an Android OS-based terminal may use GCM (Google Cloud Messaging for Android), and an iOS terminal may use APNS (Apple Push Notification Service).

When the "YES" button in the push authentication selection pop-up 401 is tapped by the user (S237), the second terminal 4 transmits the push ID received from the push notification server 8 and a push authentication operation completion notification to the first application server 6 (S239).

The first application server 6 (push authentication operation completion notification reception unit 212, token ID generation unit 213), upon receiving the push authentication operation completion notification, generates a token ID (S241). Then, the first application server 6 (push ID matching unit 214) matches the push ID received from the second terminal 4 along with the push authentication operation completion notification against the push ID from the first terminal 3 stored in the database 9 (storage unit 223) (S243). Note that the token ID may be generated after the push ID matching is performed. If the matching succeeds, the token ID is stored in the database 9 (storage unit 223) in association with the push ID received from the second terminal 4 along with the push authentication operation completion notification, in such a manner as to be valid only for a predetermined short time, for example, one minute (S245). The first application server 6 (token ID transmission unit 215) transmits the generated token ID to the second application server 7 (S247). Here, the token ID may be generated by another server at another appropriate timing.

The second application server 7 transmits the received token ID and a push authentication completion notification to the first terminal 3 (S249).

When the first terminal 3 receives the push authentication completion notification, re-authentication processing is started. The first terminal 3 transmits the push ID stored in the first terminal 3 and the token ID received from the second application server 7 to the Web server 5 (S251). Here, the push ID is one stored in the first terminal 3 in such a manner as to be valid only for the predetermined short time as described above. Accordingly, if a configuration in which the stored push ID will be deleted after the predetermined short time, or the like is used, the push ID is not transmitted from the first terminal 3 after the predetermined short time has passed since the push ID was stored in the first terminal 3.

The Web server 5 (push ID and token ID reception unit 217) receives the push ID and the token ID from the first terminal 3, and transmits the received push ID and token ID to the first application server 6 (S253).

The first application server 6 (push ID and token ID matching unit 219) matches a combination of the push ID and the token ID received from the Web server 5 against a combination of the push ID and the token ID that are received by the first application server 7 and stored in the database 9 (storage unit 223) in such a manner as to be valid only for the predetermined short time (S255), and transmits a result of the matching to the Web server 5 (S257). Here, since the token ID stored in the database 9 (storage unit 223) is stored in such a manner as to be valid only for the predetermined short time as described above, the matching fails after one minute has passed since the token ID was stored in the database 9 (storage unit 223). If the matching succeeds, the push ID is also transmitted to the Web server 5, in addition to the result of the matching.

The Web server 5 (post-matching processing unit 221) performs processing according to the result of the matching received from the first application server 6. That is, if the result of the matching indicates "success", the Web server 5 acquires the unlogged-in state session key corresponding to the received push ID from the database 9 (storage unit 223) (S259), generates a new logged-in state session key (S261), and stores the new logged-in state session key in the database 9 (storage unit 223) in replacement of the unlogged-in state session key (S263). Then, the Web server 5 redirects the first terminal 3 to a post-login screen (S265). If the result of the matching indicates "failure", the Web server 5 transmits to the first terminal 3 information for displaying a screen indicating that the authentication fails.

In the above-described embodiments, the identification information inputted into the first terminal is the user ID inputted by the user. However, the identification information is not limited to this, and any appropriate identification information may be used. For example, identification information received from a mobile information processing device, such as an IC card or a mobile terminal, may also be used. That is, for example, considering a case of using an IC card for the mobile information processing device and using a card ID for the identification information, the first terminal including an IC card reader/writer may receive the card ID from the IC card and transmit the received card ID to the Web server, and the Web server may perform card ID matching by referring to a table in which the card ID and a second terminal unique ID are associated with each other. In this case, the card ID matching may be performed by referring to a database in which the card ID and the second terminal unique ID are stored not in a directly associated manner but in an indirectly associated manner, such as the card ID and the second terminal unique ID being associated through a table in which the card ID and a user ID are associated with each other and a table in which the user ID and the second terminal unique ID are associated with each other.

In the above-described embodiments, a description is given of an example in which authentication is performed at the time of logging in. However, the present invention is not limited to this. It is needless to say that the present invention is broadly applicable to authentication in general, such as room entry/exit management.

In the above-described embodiments, matching is performed on combinations of a push ID and a token ID for authentication. However, matching may be performed only on push IDs.

According to one or more embodiments, it is possible to implement a simple and easy authentication method that does not require an input of any of knowledge authentication information except identification information, for example, a user ID or a card ID, ownership authentication information, and biometric authentication information, at the time of authentication.

Moreover, according to one or more embodiments, when push authentication is requested, a push ID is generated and transmitted to each of the first terminal and the second terminal, and the push ID returned by way of the first terminal is matched against the push ID returned by way of the second terminal, whereby it is possible to implement the authentication method with strong security.

Further, according to one or more embodiments, a token ID is generated in addition to a push ID, and matching is also performed on combinations of a push ID and a token ID. Accordingly, it is possible to implement the authentication method with stronger security.

Furthermore, according to one or more embodiments, a validity period is further provided to each of a push ID and a token ID. Accordingly, it is possible to implement the authentication method with still stronger security.

In one or more embodiments, in addition to the above-described embodiments, not only a push authentication request from the first terminal but a push authentication request from the second terminal is also required. If the push authentication request from the second terminal is a legitimate one, a push authentication permission flag is stored, and it is determined whether or not the subsequent push authentication request from the first terminal is a legitimate one, also taking it into consideration whether or not the push authentication permission flag is stored.

Figure 8:
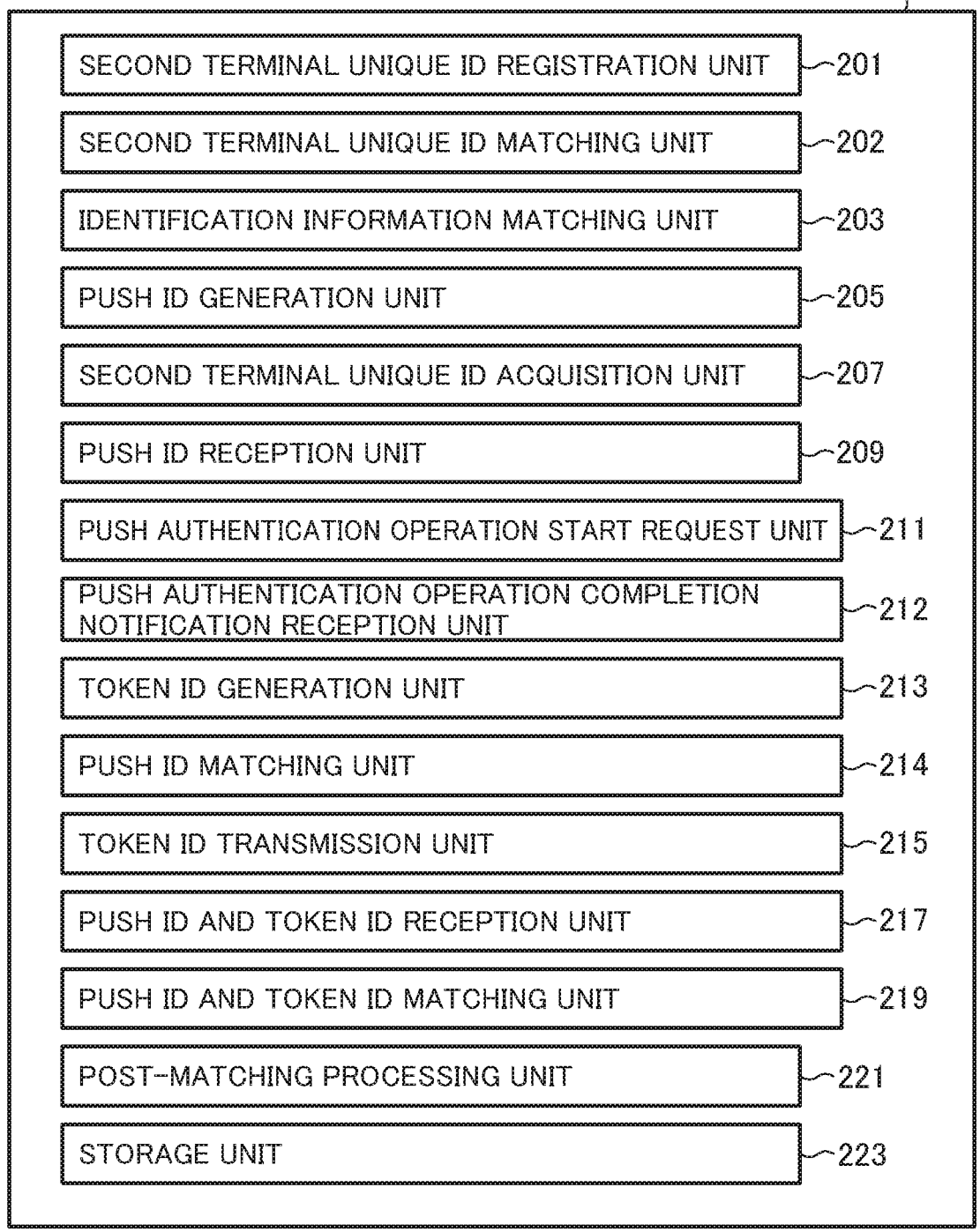
FIG. 8 shows a functional configuration of an authentication subsystem according to one or more embodiments of the present invention.

FIG. 8 shows a functional configuration of an authentication subsystem according to one or more embodiments of the present invention. FIGS. 9A to 9C show a part of a sequence diagram of an example of push authentication processing according to one or more embodiments of the present invention, respectively. An authentication system and an example of authentication processing in the authentication system according to one or more embodiments of the present invention will be described with reference to FIGS. 8, 9A to 9C, and the like. Corresponding portions in FIGS. 8 and 9A to 9C and in FIGS. 2 and 5A to 5B are denoted by the same reference signs, and an overlapping description with the above-described embodiments will be omitted. An entire configuration and a hardware configuration of the authentication system according to one or more embodiments are similar to those of the above-described embodiments, and therefore a description thereof will be omitted.

The authentication subsystem 2 includes a second terminal unique ID matching unit 202, in addition to the components in the above-described embodiments.

The second terminal unique ID matching unit 202 matches a unique ID of the second terminal 4 received from the second terminal 4 against a second terminal unique ID stored in the storage unit 223 in association with identification information. If the second terminal unique ID exists that matches the unique ID of the second terminal 4 received from the second terminal 4, the second terminal unique ID matching unit 202 stores a push authentication permission flag in the storage unit 223 in association with the identification information stored in the storage unit 223 in association with the unique ID of the second terminal 4, in such a manner that the push authentication permission flag will be valid only for a predetermined short time. Here, the configuration of "storing a push authentication permission flag in such a manner that the push authentication permission flag will be valid" may be, similarly to the configurations described earlier, a configuration in which the stored push authentication permission flag will be deleted after the predetermined short time, or may be a configuration in which a validity period of the push authentication permission flag is the predetermined short time.

After the first terminal 3 transmits identification information inputted into the first terminal 3 and a first push authentication request to the identification information matching unit 203, the identification information matching unit 203 matches the identification information received from the first terminal 3 against the identification information stored in the storage unit 223 in association with the second terminal unique ID. If the identification information exists that matches the identification information received from the first terminal 3, the identification information matching unit 203 checks whether or not the push authentication permission flag is validly stored in the storage unit 223 in association with the identification information.

The second terminal 4 transmits identification information inputted into the second terminal 4 and the unique ID of the second terminal 4 to the second terminal unique ID registration unit 201. Before the first terminal 3 transmits the identification information inputted into the first terminal 3 and the first push authentication request to the identification information matching unit 203, the second terminal 4 transmits a third push authentication request (second request for push authentication) and the unique ID of the second terminal 4 to the authentication subsystem 2. Upon receiving a push authentication operation start request, the second terminal 4 prompts the user, for push authentication, to perform only a predetermined operation that does not involve inputting of any of knowledge authentication information, ownership authentication information, and biometric authentication information. When the predetermined operation is performed by the user, the second terminal 4 transmits a push ID received from the push authentication operation start request unit 211 and a push authentication operation completion notification to the push authentication operation completion notification reception unit 212.

The first application server 6 includes the second terminal unique ID matching unit 202, the second terminal unique ID acquisition unit 207, the push authentication operation completion notification reception unit 212, the token ID generation unit 213, the push ID matching unit 214, and the push ID and token ID matching unit 219 of the authentication subsystem 2.

The other functional configuration is similar to the functional configuration of the above-described embodiments, and therefore a description thereof will be omitted.

Premised on the above-described system configuration, an example of the authentication processing in the authentication system according to one or more embodiments of the present invention will be described below.

The user makes access to the first application server 6 from the second terminal 4 (S151). Then, a push authentication start wish input screen is transmitted from the first application server 6 to the second terminal 4 (S153), and the second terminal 4 displays the push authentication start wish input screen.

When the user makes an input to the effect that the user wishes to start push authentication, the second terminal 4 transmits a third push authentication request and the unique ID of the second terminal 4 to the first application server 6 (S155).

The first application server 6 (second terminal unique ID matching unit 202) matches the unique ID of the second terminal 4 received from the second terminal 4 against the second terminal unique ID stored in the database 9 (storage unit 223) in step S105 (S157). If the second terminal unique ID exists that matches the unique ID of the second terminal 4 received from the second terminal 4, the first application server 6 (second terminal unique ID matching unit 202) stores a push authentication permission flag in the database 9 (storage unit 223) in association with the unique ID of the second terminal 4 in such a manner that the push authentication permission flag will be valid only for a predetermined short time, for example, 30 seconds (S159). At the same time, the first application server 6 (second terminal unique ID matching unit) transmits to the second terminal 4 a guidance screen indicating that a push authentication request needs to be issued from the first terminal 3 within the predetermined short time (S161).

Subsequently, the user makes access to the Web server 5 from the first terminal 3 (S201). Then, the Web server 5 transmits the login screen 30 to the first terminal 3 (S203), and the first terminal 3 displays the login screen.

Meanwhile, the Web server 5 generates an unlogged-in state session key (S204) and stores the unlogged-in state session key in the database 9 (storage unit 223) (S205).

In the login screen 30, the user ID input field 301, the password input field 303, the log in button 305, and the push authentication button 307 are displayed, and the user is prompted to input the user ID and a selection of an authentication method, which is either push authentication or password authentication that is non-push authentication (S207).

When the user inputs the user ID into the user ID input field 301 (S209) and selects push authentication by pressing the push authentication button 307, the first terminal 3 transmits the user ID and a first push authentication request to the Web server 5 (S211).

The Web server 5 (identification information matching unit 203) matches the user ID received from the first terminal against the user ID stored in the database 9 (storage unit 223) in step S105. If the user ID exists that matches the user ID received from the first terminal 3, the Web server 5 checks whether or not the push authentication permission flag is validly stored in the database 9 (storage unit 223) in association with the user ID (S213'). If the user ID exists that matches the user ID received from the first terminal 3 and if the push authentication permission flag is validly stored in association with the user ID, the Web server 5 (push ID generation unit 205) generates a push ID (S215). Then, the Web server 5 stores the generated push ID in the database 9 (storage unit 223) in association with the unlogged-in state session key stored in the database 9 (storage unit 223) (S217). The Web server 5 (push ID generation unit 205) transmits the push ID, the user ID, and a second push authentication request to the first application server 6 (S219). At the same time, the Web server 5 (push ID generation unit 205) transmits the push ID and a screen indicating that authentication processing is in progress to the first terminal 3 (S221'). In this case, the push ID may be embedded in the screen indicating that authentication processing is in progress.

In step S213', if the user ID that matches the user ID received from the first terminal 3 does not exist, or if the push authentication permission flag is not validly stored in association with the user ID that matches the user ID received from the first terminal 3, the Web server 5 (identification information matching unit 203) transmits a screen indicating that authentication fails to the first terminal 3 (S221'). In place of the configuration of transmitting the screen indicating that authentication fails to the first terminal 3, any other appropriate authentication failure processing may be performed, such as terminating the authentication processing at an appropriate subsequent point of time, or terminating the authentication processing after taking another condition into consideration.

Processing thereafter is similar to the processing in and after step S223 in the above-described embodiments, and therefore a description thereof will be omitted.

According to one or more embodiments, not only the push authentication request from the first terminal but the push authentication request from the second terminal is also required. If the push authentication request from the second terminal is a legitimate one, the push authentication permission flag is stored, and it is determined whether or not the subsequent push authentication request from the first terminal is a legitimate one, taking it into consideration whether or not the push authentication permission flag is stored. Thus, it is possible to implement an authentication method with stronger security.

In one or more embodiments, in addition to the authentication processing according to the above-described embodiments, matching is also performed on first terminal user agents.

Figure 10:
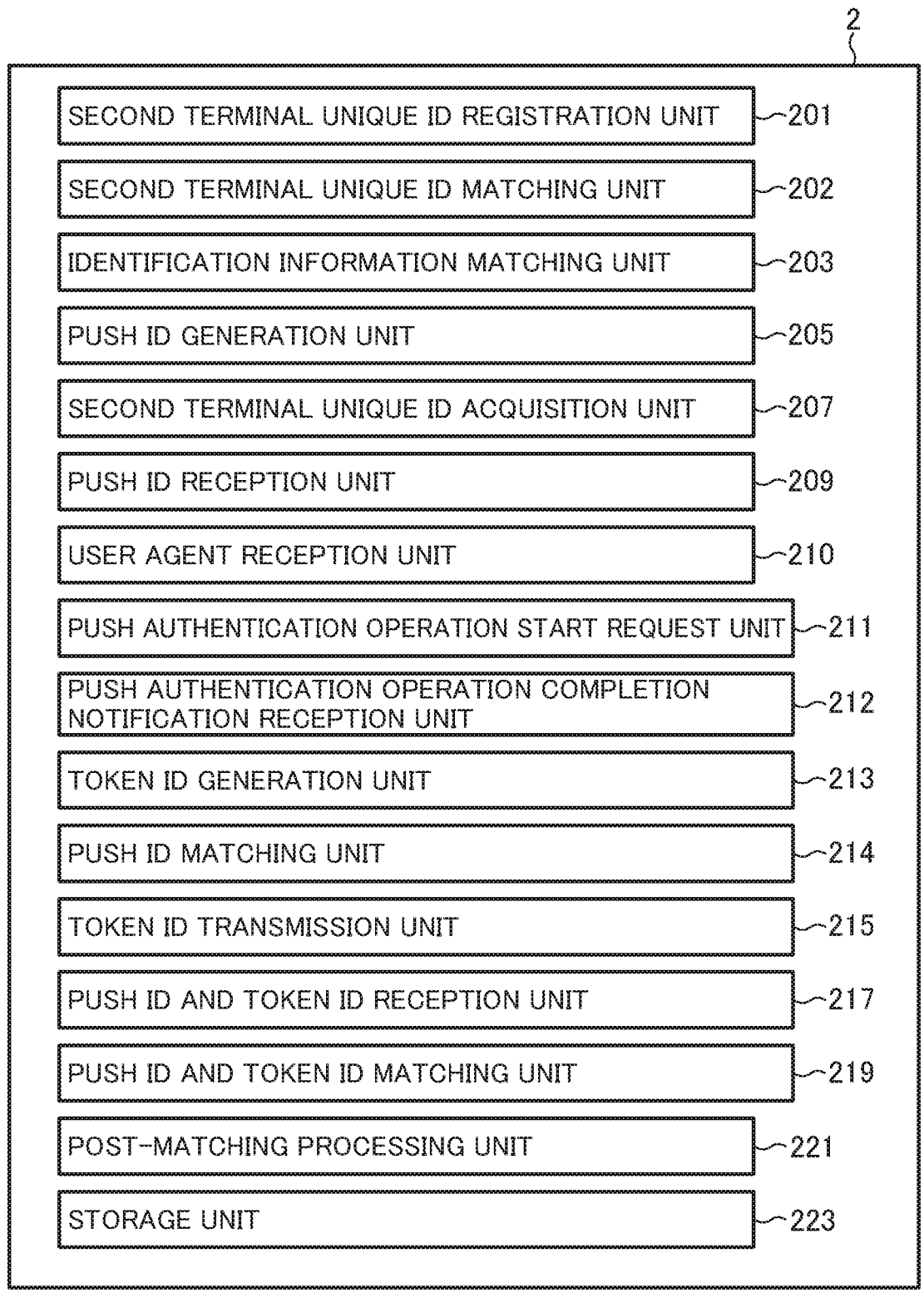
FIG. 10 shows a functional configuration of an authentication subsystem according to one or more embodiments of the present invention.

FIG. 10 shows a functional configuration of an authentication subsystem according to one or more embodiments of the present invention. FIGS. 11A to 11C show a part of a sequence diagram of an example of push authentication processing according to one or more embodiments of the present invention, respectively. An authentication system and an example of authentication processing in the authentication system according to one or more embodiments of the present invention will be described with reference to FIGS. 10, 11A to 11C, and the like. Corresponding parts in FIGS. 9A to 9C and in FIGS. 5A to 5C and FIGS. 8A to 8C are denoted by the same reference signs, and an overlapping description with the above-described embodiments will be omitted. An entire configuration and a hardware configuration of the authentication system according to one or more embodiments are similar to those of the above-described embodiments, and therefore a description thereof will be omitted.

The authentication subsystem 2 includes a user agent reception unit 210, in addition to the components in the above-described embodiments.

After the first terminal 3 transmits identification information inputted into the first terminal 3 and a first push authentication request to the identification information matching unit 203, the identification information matching unit 203 matches the identification information received from the first terminal 3 against identification information stored in the storage unit 223 in association with a second terminal unique ID. If the identification information exists that matches the identification information received from the first terminal 3, the identification information matching unit 203 checks whether or not a push authentication permission flag is validly stored in the storage unit 223 in association with the identification information. The identification information matching unit 203 also matches a combination of the identification information and a user agent of the first terminal 3 received from the first terminal 3 against a combination of the identification information and a first terminal user agent stored in the storage unit 223.

The user agent reception unit 210, upon receiving a user agent from the second terminal 4, stores the user agent in the storage unit 223 in association with a user ID received from the push ID generation unit 205, and transmits a user agent registration completion notification to the push authentication operation start request unit.

The first terminal 3 transmits inputted identification information and a first push authentication request to the identification information matching unit 203. The first terminal 3 stores a push ID received from the push ID generation unit 205 in such a manner that the push ID will be valid only for a predetermined short time, and transmits the push ID to the push ID reception unit 209. The first terminal 3, upon receiving a push authentication completion notification, transmits the push ID stored in the first terminal 3 and a token ID received from the token ID transmission unit 215 to the push ID and token ID reception unit 217. The first terminal 3 transmits a user agent of the first terminal 3 to the identification information matching unit 203.

The first application server 6 includes the second terminal unique ID matching unit 202, the second terminal unique ID acquisition unit 207, the push authentication operation completion notification reception unit 212, the user agent reception unit 210, the token ID generation unit 213, the push ID matching unit 214, and the push ID and token ID matching unit 219 of the authentication subsystem 2.

The other functional configuration is similar to the functional configuration of the above-described embodiments, and therefore a description thereof will be omitted.

Premised on the above-described system configuration, an example of the authentication processing in the authentication system according to one or more embodiments of the present invention will be described below.

Steps S151 to 159 are similar to the above-described embodiments, and therefore a description thereof will be omitted.

The user makes access to the Web server 5 from the first terminal 3 (S201). At the time of the access, since the first terminal 3 transmits the user agent of the first terminal 3 to the Web server 5, the Web server 5 stores the received user agent of the first terminal 3 in the database 9 (storage unit 223). The Web server 5 transmits the login screen 30 to the first terminal 3 (S203), and the first terminal 3 displays the login screen.

Meanwhile, the Web server 5 generates an unlogged-in state session key (S204) and stores the unlogged-in state session key in the database 9 (storage unit 223) (S205).

In the login screen 30, the user ID input field 301, the password input field 303, the log in button 305, and the push authentication button 307 are displayed, and the user is prompted to input the user ID and a selection of an authentication method, which is either push authentication or password authentication that is non-push authentication (S207).

When the user inputs the user ID into the user ID input field 301 (S209) and selects push authentication by pressing the push authentication button 307, the first terminal 3 transmits the user ID and a first push authentication request to the Web server 5 (S211).

The Web server 5 (identification information matching unit 203) matches the user ID received from the first terminal against the user ID stored in the database 9 (storage unit 223) in step S105. If the user ID exists that matches the user ID received from the first terminal 3, the Web server 5 checks whether or not the push authentication permission flag is validly stored in the database 9 (storage unit 223) in association with the user ID, and matches the user agent that is received from the first terminal 3 and stored in the database 9 (storage unit 223) against a user agent stored in the database 9 (storage unit 223) in step S233c, which will be described later (S213"). If the user ID exists that matches the user ID received from the first terminal 3 and if the push authentication permission flag is validly stored in association with the user ID, the Web server 5 (push ID generation unit 205) generates a push ID (S215). Then, the Web server 5 stores the generated push ID in the database 9 (storage unit 223) in association with the unlogged-in state session key stored in the database 9 (storage unit 223) (S217). The Web server 5 (push ID generation unit 205) transmits the push ID, the user ID, and a second push authentication request to the first application server 6 (S219"). At this time, if the user agent, which is stored in the database 9 (storage unit 223) in association with a user ID corresponding to the user agent in the undermentioned step S233c, does not exist in step S213" that matches the user agent that is received from the first terminal 3 and stored in the database 9 (storage unit 223), the Web server 5 (push ID generation unit 205) transmits the user agent received from the first terminal 3 and stored, in addition to the push ID, the user ID, and the second push authentication request, to the first application server 6. At the same time, the Web server 5 (push ID generation unit 205) transmits the push ID and a screen indicating that authentication processing is in progress to the first terminal 3 (S221'). At this time, the push ID may be embedded in the screen indicating that authentication processing is in progress.

In step 213", if the user ID that matches the user ID received from the first terminal 3 does not exist, or if the push authentication permission flag is not validly stored in association with the user ID that matches the user ID received from the first terminal 3, the Web server 5 (identification information matching unit 203) transmits a screen indicating that authentication fails to the first terminal 3 (S221').

The first application server 6 (second terminal unique ID acquisition unit 207), upon receiving the second push authentication request from the Web server 5, acquires the unique ID of the second terminal 4 stored in the database 9 (storage unit 223) in association with the user ID, based on the user ID received along with the second push authentication request (S223), and transmits the unique ID of the second terminal 4 and the push ID received along with the second push authentication request, and also the user agent if the user agent is received, to the push notification server 8 (S225").

Meanwhile, the first terminal 3 stores the push ID received from the Web server 5 in such a manner that the push ID will be valid only for a predetermined short time, for example, 30 seconds (S227), and transmits the received push ID to the second application server 7 by asynchronous communication (S229). For a scheme of the asynchronous communication, any appropriate scheme such as Websocket may be used. By using the asynchronous communication, it is possible to reduce a wait load on the Web server 5.

The second application server 7 (push ID reception unit 209) stores the push ID received from the first terminal 3 in the storage unit 223 (S231).

If the user agent is not received, the push notification server 8 (push authentication operation start request unit 211) transmits the push ID received from the first application server 6 and a push authentication operation start request to the second terminal 4, based on the unique ID of the second terminal 4 received from the first application server 6 (S233). If the user agent is received, the push notification server 8 (push authentication operation start request unit 211) transmits to the second terminal 4, based on the unique ID of the second terminal 4 received from the first application server 6, a user agent registration permission screen indicating that a push authentication request is received from an unregistered terminal (browser) and allowing an input to be made as to whether or not registration of the terminal (browser) is permitted (S233a).

If the user makes an input to the effect that registration of the unregistered terminal (browser) is not permitted, the authentication processing is terminated at that moment. If the user makes an input to the effect that registration of the unregistered terminal (browser) is permitted, the second terminal 4 transmits the user agent to the first application server 6 (user agent reception unit 210) (S233b). The first application server 6 (user agent reception unit 210), upon receiving the user agent, stores the user agent in the database 9 (storage unit 223) in association with the user ID received in step 219" (S233c), and transmits a user agent registration completion notification to the push notification server 8 (push authentication operation start request unit 211) (S233d). The push notification server 8 (push authentication operation start request unit 211), upon receiving the user agent registration completion notification, transmits the push ID received from the first application server 6 and a push authentication operation start request to the second terminal 4 (S233).

Processing thereafter is similar to the processing in and after step S235 in the above-described embodiments, and therefore a description thereof will be omitted.

In the above-described embodiments, a configuration is made such that registration of the user agent is performed by permission of the user for registration when it is determined that the user agent is not registered. However, registration of the user agent may be performed at any appropriate timing, for example, during the processing of registering the information required for use of push authentication in one or more embodiments, or the like.

According to one or more embodiments, in addition to the authentication processing according to the above-described embodiments, matching is also performed on first terminal user agents, whereby it is possible to implement an authentication method with stronger security.

In one or more embodiments, before the first terminal transmits the identification information inputted into the first terminal and the first request for push authentication to the authentication subsystem, the second terminal transmits a third request for push authentication and the unique ID of the second terminal to the authentication subsystem, the authentication subsystem matches the unique ID of the second terminal received from the second terminal against the unique ID of the second terminal stored in association with the identification information and, if the unique ID of the second terminal exists that matches the unique ID of the second terminal received from the second terminal, stores a push authentication permission flag in association with the identification information stored in association with the unique ID of the second terminal, after the first terminal transmits the identification information inputted into the first terminal and the first request for push authentication to the authentication subsystem, the authentication subsystem matches the identification information received from the first terminal against the identification information stored in association with the unique ID of the second terminal and, if the identification information exists that matches the identification information received from the first terminal, checks whether or not the push authentication permission flag is stored in association with the identification information, and if the push authentication permission flag is not stored in association with the identification information, the authentication subsystem does not transmit the push authentication operation start request to the second terminal, or performs other authentication failure processing.

In one or more embodiments, the one or more processors are further configured to execute the instructions stored in the one or more memories to: generate a token ID; transmit the token ID and a push authentication completion notification to the first terminal; to receive the push ID and the token ID from the first terminal; and match a combination of the push ID and the token ID received from the first terminal against a combination of a push ID and a token ID stored in the one or more storages, wherein if the push ID exists that matches the push ID received from the second terminal, the authentication subsystem stores the token ID in the one or more storages in association with the push ID received from the second terminal, and the first terminal, upon receiving the push authentication completion notification, transmits the push ID stored in the first terminal and the token ID received from the authentication subsystem to the authentication subsystem.

In one or more embodiments, inputting of the identification information into the first terminal is performed in such a manner that the first terminal prompts the user to input information required for authentication that includes the identification information and a selection of an authentication method, which is either push authentication or non-push authentication, and the identification information and a selection of the push authentication are inputted by the user.

In one or more embodiments, inputting of the identification information into the first terminal is performed in such a manner that the identification information is received from a mobile information processing device that stores the identification information.

In one or more embodiments, the first terminal stores the push ID received from the authentication subsystem in such a manner that the push ID will be valid only for a predetermined short time, and/or the authentication subsystem matches the push ID received from the second terminal against the push ID from the first terminal stored in the one or more storages and, if the push ID exists that matches the push ID received from the second terminal, stores the token ID in the one or more storages in association with the push ID received from the second terminal in such a manner that the token ID will be valid only for a predetermined short time.

In one or more embodiments, the one or more processors are further configured to execute the instructions stored in the one or more memories to store the identification information and the unique ID of the second terminal received from the second terminal in the one or more storages in association with each other, wherein the second terminal transmits the identification information inputted into the second terminal and the unique ID of the second terminal to the authentication subsystem.

In one or more embodiments, the one or more processors are further configured to execute the instructions stored in the one or more memories to match the unique ID of the second terminal received from the second terminal against the unique ID of the second terminal stored in the one or more storages in association with the identification information and, if the unique ID of the second terminal exists that matches the unique ID of the second terminal received from the second terminal, store a push authentication permission flag in the one or more storages in association with the identification information stored in the one or more storages in association with the unique ID of the second terminal, wherein before the first terminal transmits the identification information inputted into the first terminal and the first request for push authentication to the authentication subsystem, the second terminal transmits a third request for push authentication and the unique ID of the second terminal to the authentication subsystem, after the first terminal transmits the identification information inputted into the first terminal and the first request for push authentication to the authentication subsystem, the authentication subsystem matches the identification information received from the first terminal against the identification information stored in the one or more storages in association with the unique ID of the second terminal and, if the identification information exists that matches the identification information received from the first terminal, checks whether or not the push authentication permission flag is stored in the one or more storages in association with the identification information, and if the push authentication permission flag is not stored in the one or more storages in association with the identification information, the push authentication operation start request is not transmitted to the second terminal, or other authentication failure processing is performed.

In one or more embodiments, if the unique ID of the second terminal exists that matches the unique ID of the second terminal received from the first terminal, the authentication subsystem stores the push authentication permission flag in the one or more storages only for a predetermined short time in association with the identification information stored in the one or more storages in association with the unique ID of the second terminal.

In one or more embodiments, the one or more storages stores the identification information and a user agent of the first terminal in association with each other, the first terminal transmits a user agent of the first terminal to the authentication subsystem, and the authentication subsystem matches a combination of the identification information and the user agent of the first terminal received from the first terminal against a combination of the identification information and the user agent of the first terminal stored in the one or more storages.

In one or more embodiments, the one or more processors are further configured to execute the instructions stored in the one or more memories to: receive a third request for push authentication and the unique ID of the second terminal transmitted from the second terminal before receiving the identification information and the first request for push authentication transmitted from the first terminal, matching the unique ID of the second terminal received from the second terminal against the unique ID of the second terminal stored in association with the identification information, and, if the unique ID of the second terminal exists that matches the unique ID of the second terminal received from the first terminal, storing a push authentication permission flag in association with the identification information stored in association with the unique ID of the second terminal; and match the identification information received from the first terminal against the identification information stored in association with the unique ID of the second terminal after a step of receiving the identification information and the first request for push authentication transmitted from the first terminal and, if the identification information exists that matches the identification information received from the first terminal, checking whether or not the push authentication permission flag is stored in association with the identification information, wherein if the push authentication permission flag is not stored in association with the identification information, the push authentication operation start request is not transmitted to the second terminal, or other authentication failure processing is performed.

In one or more embodiments, the authentication subsystem further comprises: a token ID generation unit configured to generate a token ID; a token ID transmission unit configured to transmit the token ID and a push authentication completion notification to the first terminal; a push ID and token ID reception unit configured to receive the push ID stored in the first terminal and the token ID received from the token ID transmission unit, which are transmitted from the first terminal when the first terminal receives the push authentication completion notification; and a push ID and token ID matching unit configured to match a combination of the push ID and the token ID received from the first terminal against a combination of a push ID received by the first application server and a token ID that are stored in the storage unit, and the push ID matching unit matches the push ID received from the second terminal against the push ID from the first terminal stored in the storage unit and, if the push ID exists that matches the push ID received from the second terminal, stores the token ID in the storage unit in association with the push ID received from the second terminal.

In one or more embodiments, the first terminal stores the push ID received from the push ID generation unit in such a manner that the push ID will be valid only for a predetermined short time, and/or the push ID matching unit matches the push ID received from the second terminal against the push ID from the first terminal stored in the storage unit and, if the push ID exists that matches the push ID received from the second terminal, stores the token ID in the storage unit in association with the push ID received from the second terminal in such a manner that the token ID will be valid only for a predetermined short time.

In one or more embodiments, the authentication subsystem further comprises a second terminal unique ID registration unit configured to store the identification information and the unique ID of the second terminal received from the second terminal in the storage unit in association with each other.

In one or more embodiments, the authentication subsystem further comprises a second terminal unique ID matching unit configured to match the unique ID of the second terminal received from the second terminal against the unique ID of the second terminal stored in the storage unit in association with the identification information and, if the unique ID of the second terminal exists that matches the unique ID of the second terminal received from the second terminal, store a push authentication permission flag in the storage unit in association with the identification information stored in the storage unit in association with the unique ID of the second terminal, and before the first terminal transmits the identification information inputted into the first terminal and the first request for push authentication to the identification information matching unit, the second terminal transmits a third request for push authentication and the unique ID of the second terminal to the authentication subsystem, after the first terminal transmits the identification information inputted into the first terminal and the first request for push authentication to the identification information matching unit, the identification information matching unit matches the identification information received from the first terminal against the identification information stored in the storage unit in association with the unique ID of the second terminal and, if the identification information exists that matches the identification information received from the first terminal, checks whether or not the push authentication permission flag is stored in the storage unit in association with the identification information, and if the push authentication permission flag is not stored in the storage unit in association with the identification information, the push authentication operation start request is not transmitted to the second terminal, or other authentication failure processing is performed.

In one or more embodiments, if the unique ID of the second terminal exists that matches the unique ID of the second terminal received from the first terminal, the identification information matching unit stores the push authentication permission flag in the storage unit only for a predetermined short time in association with the identification information stored in the storage unit in association with the unique ID of the second terminal.

In one or more embodiments, the storage unit stores the identification information and a user agent of the first terminal in association with each other, the first terminal transmits a user agent of the first terminal to the identification information matching unit, and the identification information matching unit matches a combination of the identification information and the user agent of the first terminal received from the first terminal against a combination of the identification information and the user agent of the first terminal stored in the storage unit.

In one or more embodiments, the authentication method further comprises the steps of: before the step of, by the first terminal, transmitting the identification information inputted into the first terminal and the first request for push authentication to the authentication subsystem, by the second terminal, transmitting a third request for push authentication and the unique ID of the second terminal to the authentication subsystem; by the authentication subsystem, matching the unique ID of the second terminal received from the second terminal against the unique ID of the second terminal stored in association with the identification information and, if the unique ID of the second terminal exists that matches the unique ID of the second terminal received from the second terminal, storing a push authentication permission flag in association with the identification information stored in association with the unique ID of the second terminal; and after the step of, by the first terminal, transmitting the identification information inputted into the first terminal and the first request for push authentication to the authentication subsystem, by the authentication subsystem, matching the identification information received from the first terminal against the identification information stored in association with the unique ID of the second terminal and, if the identification information exists that matches the identification information received from the first terminal, checking whether or not the push authentication permission flag is stored in association with the identification information, and if the push authentication permission flag is not stored in association with the identification information, the authentication subsystem does not transmit the push authentication operation start request to the second terminal, or performs other authentication failure processing.

In one or more embodiments, the authentication subsystem further includes a token ID transmission unit, a push ID and token ID reception unit, and a push ID and token ID matching unit, and the authentication method further comprises the steps of: by the token ID generation unit, generating a token ID; by the push ID matching unit, matching the push ID received from the second terminal against the push ID from the first terminal stored in the storage unit and, if the push ID exists that matches the push ID received from the second terminal, storing the token ID in the storage unit in association with the push ID received from the second terminal; by the token ID transmission unit, transmitting the token ID and a push authentication completion notification to the first terminal; by the first terminal, upon receiving the push authentication completion notification, transmitting the push ID stored in the first terminal and the token ID received from the token ID transmission unit to the push ID and token ID reception unit; by the push ID and token ID reception unit, receiving the push ID and the token ID from the first terminal; and by the push ID and token ID matching unit, matching a combination of the push ID and the token ID received from the first terminal against a combination of a push ID and a token ID stored in the storage unit.

In one or more embodiments, inputting of the identification information into the first terminal is performed in such a manner that the first terminal prompts the user to input information required for authentication that includes the identification information and a selection of an authentication method, which is either push authentication or non-push authentication, and the identification information and a selection of the push authentication are inputted by the user.

In one or more embodiments, inputting of the identification information into the first terminal is performed in such a manner that the identification information is received from a mobile information processing device that stores the identification information.

In one or more embodiments, the first terminal stores the push ID received from the push ID generation unit in such a manner that the push ID will be valid only for a predetermined short time, and/or the push ID matching unit matches the push ID received from the second terminal against the push ID from the first terminal stored in the storage unit and, if the push ID exists that matches the push ID received from the second terminal, stores the token ID in the storage unit in association with the push ID received from the second terminal in such a manner that the token ID will be valid only for a predetermined short time.

In one or more embodiments, the authentication subsystem further includes a second terminal unique ID registration unit, and the authentication method further comprises the steps of: by the second terminal, transmitting the identification information inputted into the second terminal and the unique ID of the second terminal to the second terminal unique ID registration unit; and by the second terminal unique ID registration unit, storing the received identification information and the received unique ID of the second terminal in the storage unit in association with each other.

In one or more embodiments, the authentication subsystem further includes a second terminal unique ID matching unit, and the authentication method further comprises the steps of: before the step of, by the first terminal, transmitting the identification information inputted into the first terminal and the first request for push authentication to the identification information matching unit, by the second terminal, transmitting a third request for push authentication and the unique ID of the second terminal to the authentication subsystem; by the second terminal unique ID matching unit, matching the unique ID of the second terminal received from the second terminal against the unique ID of the second terminal stored in the storage unit in association with the identification information and, if the unique ID of the second terminal exists that matches the unique ID of the second terminal received from the second terminal, storing a push authentication permission flag in the storage unit in association with the identification information stored in the storage unit in association with the unique ID of the second terminal; and after the step of, by the first terminal, transmitting the identification information inputted into the first terminal and the first request for push authentication to the identification information matching unit, by the identification information matching unit, matching the identification information received from the first terminal against the identification information stored in the storage unit in association with the unique ID of the second terminal and, if the identification information exists that matches the identification information received from the first terminal, checking whether or not the push authentication permission flag is stored in the storage unit in association with the identification information, wherein if the push authentication permission flag is not stored in the storage unit in association with the identification information, the push authentication operation start request is not transmitted to the second terminal, or other authentication failure processing is performed.

In one or more embodiments, if the unique ID of the second terminal exists that matches the unique ID of the second terminal received from the first terminal, the identification information matching unit stores the push authentication permission flag in the storage unit only for a predetermined short time in association with the identification information stored in the storage unit in association with the unique ID of the second terminal.

In one or more embodiments, the identification information and a user agent of the first terminal are stored in the storage unit in association with each other, and the authentication method further comprises the steps of: by the first terminal, transmitting a user agent of the first terminal to the authentication subsystem; and by the identification information matching unit, matching a combination of the identification information and the user agent of the first terminal received from the first terminal against a combination of the identification information and the user agent of the first terminal stored in the storage unit.

In one or more embodiments, the authentication method further comprises the steps of: before the step of receiving the identification information and the first request for push authentication transmitted from the first terminal, receiving a third request for push authentication and the unique ID of the second terminal transmitted from the second terminal; matching the unique ID of the second terminal received from the second terminal against the unique ID of the second terminal stored in association with the identification information and, if the unique ID of the second terminal exists that matches the unique ID of the second terminal received from the second terminal, storing a push authentication permission flag in association with the identification information stored in association with the second terminal unique ID; and after the step of receiving the identification information and the first request for push authentication transmitted from the first terminal, matching the identification information received from the first terminal against the identification information stored in association with the unique ID of the second terminal and, if the identification information exists that matches the identification information received from the first terminal, checking whether or not the push authentication permission flag is stored in association with the identification information, and if the push authentication permission flag is not stored in association with the identification information, the push authentication operation start request is not transmitted to the second terminal, or other authentication failure processing is performed.

In one or more embodiments, the authentication subsystem further includes a token ID generation unit, a token ID transmission unit, a push ID and token ID reception unit, and a push ID and token ID matching unit, and the authentication method further comprises the steps of: by the token ID generation unit, generating a token ID; by the push ID matching unit, matching the push ID received from the second terminal against the push ID from the first terminal stored in the storage unit and, if the push ID exists that matches the push ID received from the second terminal, storing the token ID in the storage unit in association with the push ID received from the second terminal; by the token ID transmission unit, transmitting the token ID and a push authentication completion notification to the first terminal; by the push ID and token ID reception unit, receiving the push ID stored in the first terminal and the token ID received from the token ID transmission unit, which are transmitted from the first terminal when the first terminal receives the push authentication completion notification; and by the push ID and token ID matching unit, matching a combination of the push ID and the token ID received from the first terminal against a combination of a push ID and a token ID stored in the storage unit.

In one or more embodiments, the first terminal stores the push ID received from the push ID generation unit in such a manner that the push ID will be valid only for a predetermined short time, and/or the push ID matching unit matches the push ID received from the second terminal against the push ID from the first terminal stored in the storage unit and, if the push ID exists that matches the push ID received from the second terminal, stores the token ID in the storage unit in association with the push ID received from the second terminal in such a manner that the token ID will be valid only for a predetermined short time.

In one or more embodiments, the authentication subsystem further includes a second terminal unique ID matching unit, and the authentication method further comprises the steps of: before the step of receiving the identification information and the first request for push authentication transmitted from the first terminal, receiving a third request for push authentication and the unique ID of the second terminal transmitted from the second terminal; by the second terminal unique ID matching unit, matching the unique ID of the second terminal received from the second terminal against the unique ID of the second terminal stored in the storage unit in association with the identification information and, if the unique ID of the second terminal exists that matches the unique ID of the second terminal received from the second terminal, storing a push authentication permission flag in the storage unit in association with the identification information stored in the storage unit in association with the unique ID of the second terminal; and after the step of receiving the identification information and the first request for push authentication transmitted from the first terminal, by the identification information matching unit, matching the identification information received from the first terminal against the identification information stored in the storage unit in association with the unique ID of the second terminal and, if the identification information exists that matches the identification information received from the first terminal, checking whether or not the push authentication permission flag is stored in the storage unit in association with the identification information, wherein if the push authentication permission flag is not stored in the storage unit in association with the identification information, the authentication subsystem does not transmit the push authentication operation start request to the second terminal, or performs other authentication failure processing.

In one or more embodiments, if the unique ID of the second terminal exists that matches the unique ID of the second terminal received from the first terminal, the identification information matching unit stores the push authentication permission flag in the storage unit only for a predetermined short time in association with the identification information stored in the storage unit in association with the unique ID of the second terminal.

In one or more embodiments, the identification information and a user agent of the first terminal are stored in the storage unit in association with each other, the first terminal transmits a user agent of the first terminal to the authentication subsystem, and the authentication method further comprises the step of, by the identification information matching unit, matching the user agent of the first terminal received from the first terminal against the user agent of the first terminal stored in the storage unit in association with the identification information.

In one or more embodiments, a non-transitory computer-readable recording medium storing the program having instructions, when executed by the one or more processors, cause the one or more processor to perform the authentication method.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Authentication system
2 Authentication subsystem
201 Second terminal unique ID registration unit
202 Second terminal unique ID matching unit
203 Identification information matching unit
205 Push ID generation unit
207 Second terminal unique ID acquisition unit
209 Push ID reception unit
210 User agent reception unit
211 Push authentication operation start request unit
212 Push authentication operation completion notification reception unit
213 Token ID generation unit
214 Push ID matching unit
215 Token ID transmission unit
217 Push ID and token ID reception unit
219 Push ID and token ID matching unit
221 Post-matching processing unit
223 Storage unit
3 First terminal
30a CPU
30b RAM
30c ROM
30d External memory
30e Input unit
30f Output unit
30g Communication unit
30h System bus
30 Login screen
301 User ID input field
303 Password input field
305 Log in button
307 Push authentication button
4 Second terminal
40 Display screen
401 Push authentication selection pop-up
5 Web server
6 First application server
7 Second application server
8 Push notification server

The invention claimed is:

1. An authentication system comprising:
a first terminal;
a second terminal; and
an authentication subsystem, wherein
the first terminal transmits first identification information inputted into the first terminal and a first request for push authentication to the authentication subsystem,
the authentication subsystem matches the first identification information received from the first terminal against second identification information stored in association with a unique ID of the second terminal, and if the second identification information matching the first identification information exists, transmits a push authentication operation start request to the second terminal based on the unique ID of the second terminal stored in association with the second identification information,
upon receiving the push authentication operation start request, the second terminal prompts a user, for the push authentication, to perform a predetermined operation other than inputting any of knowledge authentication information, ownership authentication information, and biometric authentication information, and when the predetermined operation is performed by the user, transmits a push authentication operation completion notification to the authentication subsystem,
before the first terminal transmits the first identification information and the first request for push authentication to the authentication subsystem,
the second terminal transmits a second request for push authentication and the unique ID of the second terminal to the authentication subsystem,
the authentication subsystem matches the unique ID of the second terminal received from the second terminal against the unique ID of the second terminal stored in association with the second identification information, and if the stored unique ID of the second terminal matching the received unique ID of the second terminal exists, stores a push authentication permission flag in association with the stored second identification information,
after the first terminal transmits the first identification information and the first request for push authentication to the authentication subsystem,
the authentication subsystem matches the first identification information received from the first terminal against the second identification information stored in association with the unique ID of the second terminal, and if the second identification information matching the first identification information exists, checks whether or not the push authentication permission flag is stored in association with the stored second identification information, and
if the push authentication permission flag is not stored in association with the stored second identification information, the authentication subsystem does not transmit the push authentication operation start request to the second terminal, or performs other authentication failure processing.

2. An authentication system comprising:
a first terminal;
a second terminal; and
an authentication subsystem, wherein
the authentication subsystem includes:
a storage;
a memory that stores an instruction; and
a processor that executes the instruction stored in the memory to:
match first identification information received from the first terminal against second identification information stored in the storage in association with a unique ID of the second terminal;
generate and transmit a push ID to the first terminal if the second identification information matching the first identification information is stored in the storage;
based on the second identification information matching the first identification information, acquire the unique ID of the second terminal stored in the storage in association with the second identification information;

store the push ID received from the first terminal in the storage;

transmit the generated push ID and a push authentication operation start request to the second terminal based on the acquired unique ID of the second terminal;

receive a push authentication operation completion notification transmitted from the second terminal; and match the push ID received from the second terminal against the push ID received from the first terminal and stored in the storage, the first terminal:

transmits the first identification information inputted into the first terminal and a first request for push authentication to the authentication subsystem; and stores the push ID received from the authentication subsystem and transmits the push ID to the authentication subsystem, and the second terminal:

upon receiving the push authentication operation start request, prompts a user, for the push authentication, to perform a predetermined operation other than inputting any of knowledge authentication information, ownership authentication information, and biometric authentication information, and when the predetermined operation is performed by the user, transmits the push ID received from the authentication subsystem and the push authentication operation completion notification to the authentication subsystem.

3. The authentication system according to claim 2, wherein the processor further executes the instruction stored in the memory to:

generate a token ID;

transmit the token ID and a push authentication completion notification to the first terminal;

receive the push ID and the token ID from the first terminal; and match a combination of the push ID and the token ID received from the first terminal against a combination of a push ID and a token ID stored in the storage, wherein if the push ID received from the first terminal and matching the push ID received from the second terminal exists, the authentication subsystem stores the token ID in the storage in association with the push ID received from the second terminal, and upon receiving the push authentication completion notification, the first terminal transmits the push ID stored in the first terminal and the token ID received from the authentication subsystem to the authentication subsystem.

4. The authentication system according to claim 3, wherein the authentication subsystem matches the push ID received from the second terminal against the push ID received from the first terminal and stored in the storage, and if the stored push ID matching the push ID received from the second terminal exists, stores the token ID in the storage in association with the push ID received from the second terminal and makes the stored token ID valid for a predetermined short time.

5. The authentication system according to claim 2, wherein the first identification information is input into the first terminal when the first identification information is received from a mobile information processing device that stores the first identification information.

6. The authentication system according to claim 2, wherein the first terminal stores the push ID received from the authentication subsystem and makes the stored push ID valid for a predetermined short time.

7. The authentication system according to claim 2, wherein the processor further executes the instruction stored in the memory to:

store the second identification information and the unique ID of the second terminal received from the second terminal in the storage in association with each other, and wherein the second terminal transmits the second identification information inputted into the second terminal and the unique ID of the second terminal to the authentication subsystem.

8. The authentication system according to claim 2, wherein the processor further executes the instruction stored in the memory to:

match the unique ID of the second terminal received from the second terminal against the unique ID of the second terminal stored in the storage in association with the second identification information, and if the stored unique ID of the second terminal matching the received unique ID of the second terminal exists, store a push authentication permission flag in the storage in association with the stored second identification information, and wherein before the first terminal transmits the first identification information and the first request for push authentication to the authentication subsystem, the second terminal transmits a second request for push authentication and the unique ID of the second terminal to the authentication subsystem, after the first terminal transmits the first identification information and the first request for push authentication to the authentication subsystem, the authentication subsystem matches the first identification information received from the first terminal against the second identification information stored in the storage in association with the unique ID of the second terminal, and if the second identification information matching the first identification information exists, checks whether or not the push authentication permission flag is stored in the storage in association with the second identification information, and if the push authentication permission flag is not stored in the storage in association with the second identification information, the push authentication operation start request is not transmitted to the second terminal, or other authentication failure processing is performed.

9. The authentication system according to claim 8, wherein if the stored unique ID of the second terminal matching the received unique ID of the second terminal exists, the authentication subsystem stores the push authentication permission flag in the storage for a predetermined short time in association with the stored second identification information.

10. The authentication system according to claim 2, wherein the storage stores the first identification information and a user agent of the first terminal in association with each other, the first terminal transmits the user agent of the first terminal to the authentication subsystem, and the authentication subsystem matches a combination of the first identification information and the user agent of the first terminal received from the first terminal against a combination of the first identification information and the user agent of the first terminal stored in the storage.

11. An authentication subsystem comprising:
a memory that stores an instruction; and
a processor that executes the instruction stored in the memory to:
receive first identification information and a first request for push authentication transmitted from a first terminal;
match the first identification information received from the first terminal against second identification information stored in association with a unique ID of a second terminal, and if the second identification information matching the first identification information exists, transmit a push authentication operation start request to the second terminal based on the unique ID of the second terminal stored in association with the second identification information; and
receive a push authentication operation completion notification transmitted from the second terminal when a predetermined operation is performed by a user on the second terminal, wherein upon receiving the push authentication operation start request, the second terminal prompts the user, for the push authentication, to perform the predetermined operation other than inputting any of knowledge authentication information, ownership authentication information, and biometric authentication information,
wherein the processor further executes the instruction stored in the memory to:
receive a second request for push authentication and the unique ID of the second terminal transmitted from the second terminal before receiving the first identification information and the first request for push authentication transmitted from the first terminal, matching the unique ID of the second terminal received from the second terminal against the unique ID of the second terminal stored in association with the second identification information, and if the stored unique ID of the second terminal matching the received unique ID of the second terminal exists, storing a push authentication permission flag in association with the stored second identification information; and
match the first identification information received from the first terminal against the second identification information stored in association with the unique ID of the second terminal after receiving the first identification information and the first request for push authentication transmitted from the first terminal, and if the second identification information matching the first identification information exists, checking whether or not the push authentication permission flag is stored in association with the second identification information, and
if the push authentication permission flag is not stored in association with the second identification information, the push authentication operation start request is not transmitted to the second terminal, or other authentication failure processing is performed.

12. An authentication subsystem comprising:
a storage;
a memory that stores an instruction; and
a processor that executes the instruction stored in the memory to:
receive first identification information and a first request for push authentication transmitted from a first terminal, and match the first identification information against second identification information stored in the storage in association with a unique ID of a second terminal;
generate and transmit a push ID to the first terminal if the second identification information matching the first identification information exists;
based on the second identification information matching the first identification information, acquire the unique ID of the second terminal stored in the storage in association with the second identification information;
receive the push ID from the first terminal that stores the push ID received from the authentication subsystem, and store the push ID in the storage;
transmit the push ID generated by the authentication subsystem and a push authentication operation start request to the second terminal based on the unique ID of the second terminal acquired by the authentication subsystem;
receive a push authentication operation completion notification transmitted from the second terminal when a predetermined operation is performed by a user on the second terminal, wherein upon receiving the push authentication operation start request, the second terminal prompts the user, for the push authentication, to perform the predetermined operation other than inputting any of knowledge authentication information, ownership authentication information, and biometric authentication information; and
match the push ID received from the second terminal against the push ID from the first terminal stored in the storage.

13. A second terminal comprising:
a memory that stores an instruction; and
a processor that executes the instruction stored in the memory to:
receive a push ID and a push authentication operation start request transmitted by an authentication subsystem comprising a storage, wherein the push ID is generated when the authentication subsystem matches first identification information inputted into a first terminal and received from the first terminal against second identification information stored in association with a unique ID of the second terminal and determines that the second identification information matching the first identification information exists, and the push ID and the push authentication operation start request are transmitted based on the unique ID of the second terminal stored in the storage in association with the second identification information;
prompt a user in response to the push authentication operation start request, for the push authentication, to perform a predetermined operation other than inputting any of knowledge authentication information, ownership authentication information, and biometric authentication information; and
transmit the push ID received from the authentication subsystem and a push authentication operation completion notification to the authentication subsystem when the predetermined operation is performed by the user,
wherein the push ID transmitted to the authentication subsystem is the push ID generated if the second identification information matching the first identification information exists, and the push ID transmitted to the authentication subsystem is matched against the push ID transmitted to the first terminal, transmitted from the first terminal to the authentication subsystem, and stored in the storage.

14. An authentication method performed by an authentication system comprising a first terminal, a second terminal, and an authentication subsystem, the method comprising:
by the first terminal, transmitting first identification information inputted into the first terminal and a first request for push authentication to the authentication subsystem;
by the authentication subsystem, matching the first identification information received from the first terminal against second identification information stored in association with a unique ID of the second terminal, and if the second identification information matching the first identification information exists, transmitting a push authentication operation start request to the second terminal based on the unique ID of the second terminal stored in association with the second identification information;
by the second terminal, upon receiving the push authentication operation start request, prompting a user, for the push authentication, to perform a predetermined operation other than inputting any of knowledge authentication information, ownership authentication information, and biometric authentication information; and
by the second terminal, when the predetermined operation is performed by the user, transmitting a push authentication operation completion notification to the authentication subsystem, wherein
the method further comprises:
before transmitting, by the first terminal, the first identification information and the first request for push authentication to the authentication subsystem,
by the second terminal, transmitting a second request for push authentication and the unique ID of the second terminal to the authentication subsystem;
by the authentication subsystem, matching the unique ID of the second terminal received from the second terminal against the unique ID of the second terminal stored in association with the second identification information, and if the stored unique ID of the second terminal matching the received unique ID of the second terminal exists, storing a push authentication permission flag in association with the stored second identification information; and
after transmitting, by the first terminal, the first identification information and the first request for push authentication to the authentication subsystem,
by the authentication subsystem, matching the first identification information received from the first terminal against the second identification information stored in association with the unique ID of the second terminal and, if the second identification information matching the first identification information exists, checking whether or not the push authentication permission flag is stored in association with the second identification information, and if the push authentication permission flag is not stored in association with the second identification information, the authentication subsystem does not transmit the push authentication operation start request to the second terminal, or performs other authentication failure processing.

15. A non-transitory computer-readable recording medium storing a program that causes the authentication system to execute an instruction to perform the authentication method according to claim 14.

16. An authentication method performed by an authentication system comprising a first terminal, a second terminal, and an authentication subsystem, the method comprising:
by the first terminal, in response to an input of first identification information, transmitting the first identification information and a first request for push authentication to the authentication subsystem;
by the authentication subsystem, matching the first identification information received from the first terminal against second identification information stored in association with a unique ID of the second terminal, and generating and transmitting a push ID to the first terminal if the second identification information matching the first identification information exists;
by the authentication subsystem, based on the second identification information matching the first identification information, acquiring the unique ID of the second terminal stored in association with the second identification information;
by the first terminal, storing the push ID received from the authentication subsystem and transmitting the push ID to the authentication subsystem;
by the authentication subsystem, storing the push ID received from the first terminal;
by the authentication subsystem, transmitting the push ID generated by the authentication subsystem and a push authentication operation start request to the second terminal based on the unique ID of the second terminal acquired by the authentication subsystem;
by the second terminal, upon receiving the push authentication operation start request, prompting a user, for the push authentication, to perform a predetermined operation other than inputting any of knowledge authentication information, ownership authentication information, and biometric authentication information;
by the second terminal, when the predetermined operation is performed by the user, transmitting the push ID received from the authentication subsystem and a push authentication operation completion notification to the authentication subsystem; and
by the authentication subsystem, matching the push ID received from the second terminal against the stored push ID from the first terminal.

17. A non-transitory computer-readable recording medium storing a program that causes the authentication system to execute an instruction to perform the authentication method according to claim 16.

18. An authentication method performed by an authentication subsystem, the method comprising:
receiving first identification information and a first request for push authentication transmitted from a first terminal;
matching the first identification information received from the first terminal against second identification information stored in association with a unique ID of a second terminal, and if the second identification information matching the first identification information exists, transmitting a push authentication operation start request to the second terminal based on the unique ID of the second terminal stored in association with the second identification information; and receiving a push authentication operation completion notification transmitted from the second terminal when a predetermined operation is performed by a user on the second terminal, wherein upon receiving the push authentication operation start request, the second terminal prompts the user, for the push authentication, to perform the predetermined operation other than inputting any of knowledge authentication information, ownership authentication information, and biometric authentication information, and wherein the method further comprises:
before receiving the first identification information and the first request for push authentication transmitted from the first terminal,
receiving a second request for push authentication and the unique ID of the second terminal transmitted from the second terminal;
matching the unique ID of the second terminal received from the second terminal against the unique ID of the second terminal stored in association with the second identification information, and if the stored unique ID of the second terminal matching the received unique ID of the second terminal exists, storing a push authentication permission flag in association with the stored second identification information; and
after receiving the first identification information and the first request for push authentication transmitted from the first terminal,
matching the first identification information received from the first terminal against the second identification information stored in association with the unique ID of the second terminal, and if the second identification information matching the first identification information exists, checking whether or not the push authentication permission flag is stored in association with the second identification information, and
if the push authentication permission flag is not stored in association with the second identification information, the push authentication operation start request is not transmitted to the second terminal, or other authentication failure processing is performed.

19. A non-transitory computer-readable recording medium storing a program that causes the authentication system to execute an instruction to perform the authentication method according to claim 18.

20. An authentication method performed by an authentication subsystem, the method comprising:
receiving first identification information and a first request for push authentication transmitted from a first terminal;
matching the first identification information received from the first terminal against second identification information stored in association with a unique ID of a second terminal, and generating and transmitting a push ID to the first terminal if the second identification information matching the first identification information exists;
based on the second identification information matching the first identification information, acquiring the unique ID of the second terminal stored in association with the second identification information;
receiving the push ID from the first terminal that stores the push ID received from the authentication subsystem, and storing the push ID;
transmitting the generated push ID and a push authentication operation start request to the second terminal based on the acquired unique ID of the second terminal;
receiving a push authentication operation completion notification transmitted from the second terminal when a predetermined operation is performed by a user on the second terminal, wherein upon receiving the push authentication operation start request, the second terminal prompts the user, for the push authentication, to perform the predetermined operation other than inputting any of knowledge authentication information, ownership authentication information, and biometric authentication information; and
matching the push ID received from the second terminal against the stored push ID from the first terminal.

21. A non-transitory computer-readable recording medium storing a program that causes the authentication system to execute an instruction to perform the authentication method according to claim 20.

22. An authentication method performed by a second terminal, the method comprising:
receiving a push ID and a push authentication operation start request transmitted by an authentication subsystem comprising a storage, wherein the push ID is generated when the authentication subsystem matches first identification information inputted into a first terminal and received from the first terminal against second identification information stored in association with a unique ID of a second terminal and determines that the second identification information matching the first identification information exists, and the push ID and the push authentication operation start request are transmitted based on the unique ID of the second terminal stored in the storage in association with the second identification information;
in response to the push authentication operation start request, prompting a user, for the push authentication, to perform a predetermined operation other than inputting any of knowledge authentication information, ownership authentication information, and biometric authentication information;
transmitting the push ID received from the authentication subsystem and a push authentication operation completion notification to the authentication subsystem when the predetermined operation is performed by the user; and
wherein the push ID transmitted to the authentication subsystem is the push ID generated if the second identification information matching the first identification information exists, and the push ID transmitted to the authentication subsystem is matched against the push ID transmitted to the first terminal, transmitted from the first terminal to the authentication subsystem, and stored in the storage.

23. A non-transitory computer-readable recording medium storing a program that causes the authentication system to execute an instruction to perform the authentication method according to claim 22.

* * * * *